(12) United States Patent
Bell et al.

(10) Patent No.: US 12,325,038 B2
(45) Date of Patent: Jun. 10, 2025

(54) LOW BYPASS HIGH TORQUE TURBINE AND STATOR FOR A ROTATING IRRIGATION SPRINKLER

(71) Applicant: Hunter Industries, Inc., San Marcos, CA (US)

(72) Inventors: James A. Bell, Vista, CA (US); Ryan Christopher Bone, Del Mar, CA (US)

(73) Assignee: Hunter Industries, Inc., San Marcos, CA (US)

( * ) Notice: Subject to any disclaimer, the term of this patent is extended or adjusted under 35 U.S.C. 154(b) by 384 days.

(21) Appl. No.: 17/836,306

(22) Filed: Jun. 9, 2022

(65) Prior Publication Data
US 2022/0395845 A1 Dec. 15, 2022

Related U.S. Application Data

(60) Provisional application No. 63/202,507, filed on Jun. 14, 2021.

(51) Int. Cl.
*B05B 3/04* (2006.01)
*B05B 15/74* (2018.01)

(52) U.S. Cl.
CPC ............ *B05B 3/045* (2013.01); *B05B 3/0436* (2013.01); *B05B 15/74* (2018.02)

(58) Field of Classification Search
CPC ... B05B 1/3013; B05B 3/0409; B05B 3/0418; B05B 3/0422; B05B 3/0431; B05B 3/0436; B05B 3/045; B05B 15/72; B05B 15/74
See application file for complete search history.

(56) References Cited

U.S. PATENT DOCUMENTS

| | | | | |
|---|---|---|---|---|
| 3,266,730 A | * | 8/1966 | Martini | B05B 15/74 74/142 |
| 4,026,471 A | * | 5/1977 | Hunter | B05B 3/0422 239/206 |
| 4,925,098 A | * | 5/1990 | Di Paola | B05B 15/74 239/206 |
| 5,330,103 A | * | 7/1994 | Eckstein | B05B 3/0431 239/242 |

(Continued)

OTHER PUBLICATIONS

International Search Report and Written Opinion issued in corresponding PCT application No. PCT/US2022/032913 dated Oct. 6, 2022.

*Primary Examiner* — Darren W Gorman
(74) *Attorney, Agent, or Firm* — KNOBBE MARTENS OLSON & BEAR LLP

(57) ABSTRACT

A rotating sprinkler for irrigation is disclosed. The sprinkler can include a stator spaced upstream from a turbine to form a mixing region therebetween. The stator can define a primary flow path and a bypass flow path. The primary flow path is aligned relative to the plurality of blades so that water exiting the primary flow path traverses the mixing region and impinges on the plurality of blades at a first angle of attack. The bypass flow path is aligned relative to the primary flow path so that water exiting the bypass flow path intersects the water exiting the primary flow path in the mixing region to cause the water exiting the primary flow path to impinge on the plurality of blades at a second angle of attack. The sprinkler can further include a valve configured to regulate flow between the primary flow path and the bypass flow path.

23 Claims, 14 Drawing Sheets

(56) References Cited

U.S. PATENT DOCUMENTS

| | | | | |
|---|---|---|---|---|
| 5,375,768 | A * | 12/1994 | Clark | B05B 3/0422 |
| | | | | 239/206 |
| 5,676,315 | A * | 10/1997 | Han | B05B 3/0431 |
| | | | | 239/206 |
| 5,695,123 | A * | 12/1997 | Le | B05B 3/0431 |
| | | | | 239/242 |
| 5,720,435 | A * | 2/1998 | Hunter | B05B 15/74 |
| | | | | 239/204 |
| 7,134,613 | B2 * | 11/2006 | Kah, III | B05B 3/0422 |
| | | | | 239/464 |
| 9,699,974 | B2 * | 7/2017 | Clark | B05B 15/74 |
| 10,099,231 | B2 * | 10/2018 | Clark | B05B 3/0431 |
| 2003/0150934 | A1 * | 8/2003 | Lawson | B05B 3/0422 |
| | | | | 239/203 |
| 2004/0195358 | A1 | 10/2004 | Santiago et al. | |
| 2006/0071095 | A1 * | 4/2006 | McCormick | B05B 3/0418 |
| | | | | 239/225.1 |
| 2006/0192029 | A1 * | 8/2006 | Grizzle | B05B 1/262 |
| | | | | 239/205 |
| 2006/0219815 | A1 * | 10/2006 | Hekman | B05B 3/0422 |
| | | | | 239/569 |
| 2007/0007364 | A1 * | 1/2007 | Gregory | B05B 3/0422 |
| | | | | 239/206 |
| 2012/0205465 | A1 * | 8/2012 | Kah, Jr. | B05B 3/045 |
| | | | | 239/240 |

\* cited by examiner

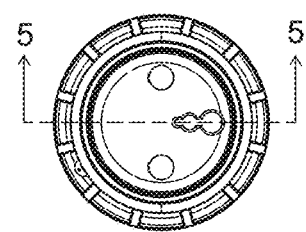
FIG. 4
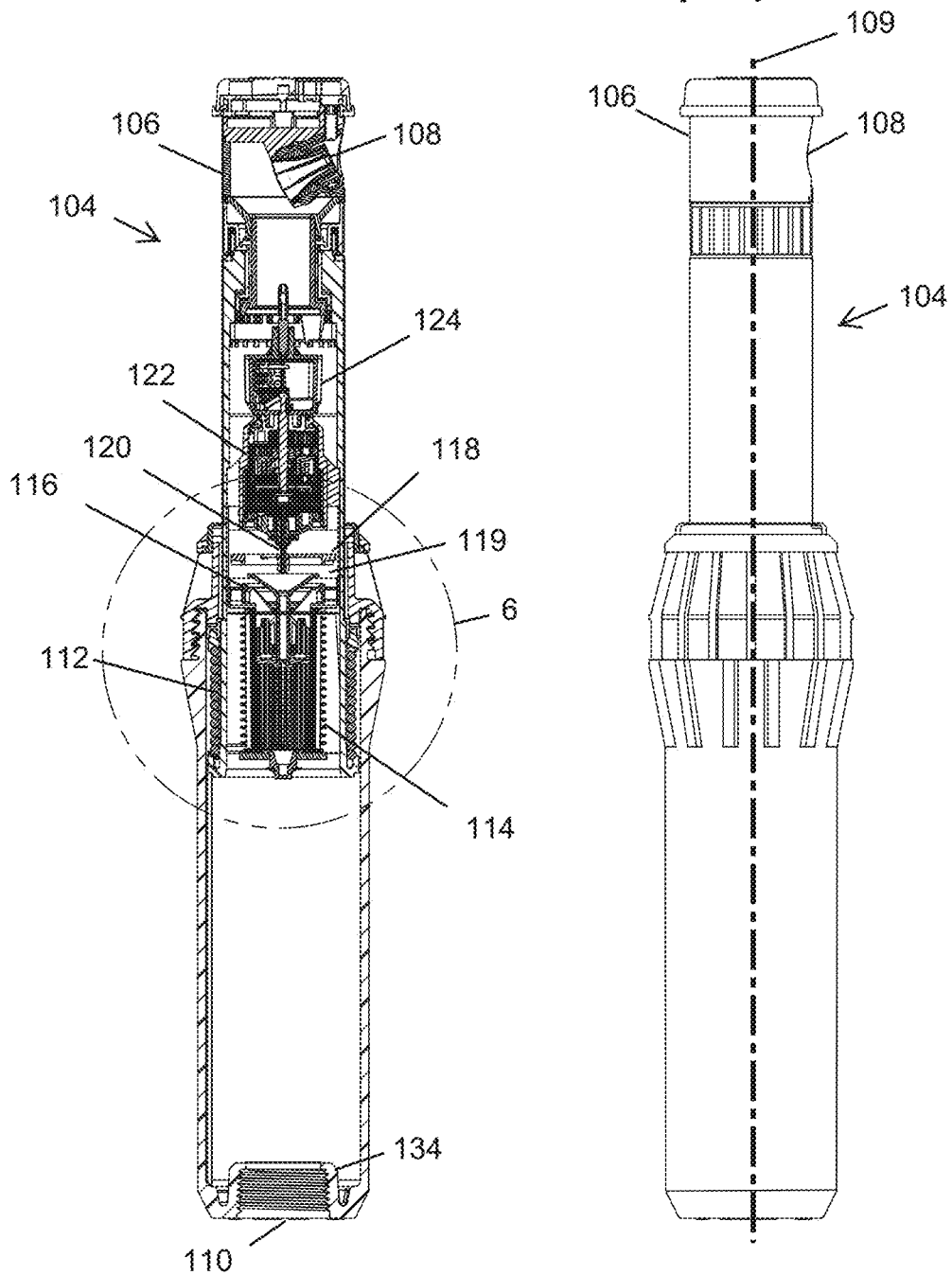
FIG. 5
FIG. 3

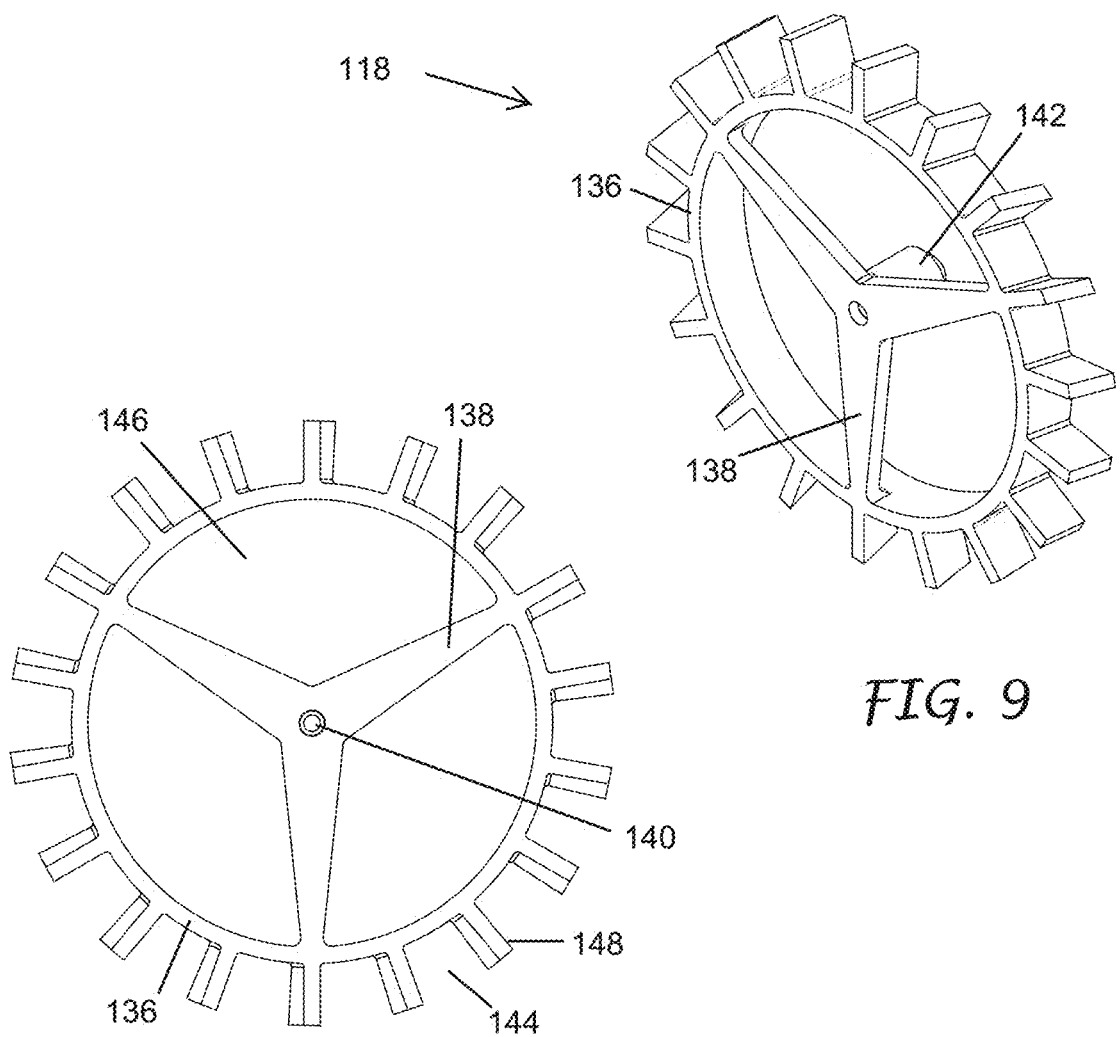
FIG. 9
FIG. 8
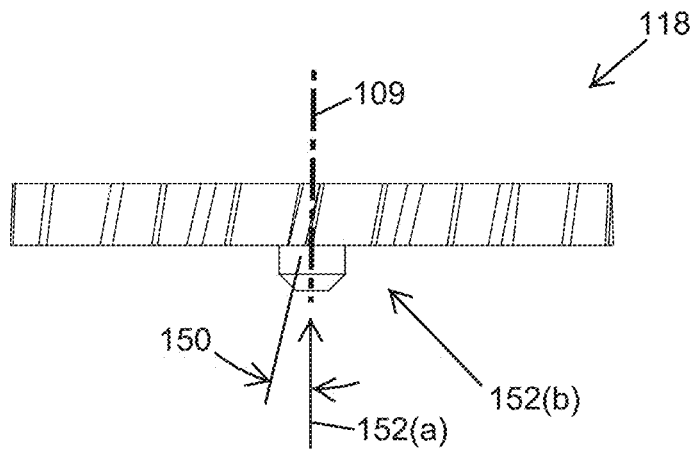
FIG. 7

LOW BYPASS HIGH TORQUE TURBINE AND STATOR FOR A ROTATING IRRIGATION SPRINKLER

CROSS-REFERENCE TO RELATED APPLICATION

This application claims benefit under 35 U.S.C. 119(e) to U.S. Provisional Patent Application No. 63/202,507, filed Jun. 14, 2021, the entire disclosure of which is hereby incorporated by reference herein in its entirety. Any and all priority claims identified in the Application Data Sheet, or any corrections thereto, are hereby incorporated by reference under 37 CFR 1.57.

TECHNICAL FIELD

The present inventions relate to apparatus for irrigating turf and landscaping, and more particularly, to rotor-type sprinklers having a turbine that rotates a nozzle through a gear train reduction.

BACKGROUND

In many parts of the United States, rainfall is insufficient and/or too irregular to keep turf and landscaping green and therefore irrigation systems are installed. Such systems typically include a plurality of underground pipes connected to sprinklers and valves; the latter being controlled by an electronic irrigation controller. One of the most popular types of sprinklers is a pop-up rotor-type sprinkler. In this type of sprinkler, a tubular member is normally retracted into an outer cylindrical case by a coil spring. The case is buried in the ground and when pressurized water is fed to the sprinkler the tubular member extends. A turbine and a gear train reduction are mounted in the tubular member for rotating a nozzle turret at the top of the tubular member. The gear train reduction is often encased in its own housing and is often referred to as a gear box. A reversing mechanism is also normally mounted in the tubular member along with an arc adjustment mechanism.

The gear drive of a rotor-type sprinkler can include a series of staggered gears and shafts. A small gear on the top of the turbine shaft drives a large gear on the lower end of an adjacent second shaft. Another small gear on the top of the second shaft drives a large gear on the lower end of a third shaft, and so on. Alternately, the gear drive can comprise a planetary arrangement in which a central shaft carries a sun gear that simultaneously drives several planetary gears on rotating circular partitions or stages that transmit reduced speed rotary motion to a succession of similar rotating stages. It is common for the planetary gears of the stages to engage corresponding ring gears formed on the inner surface of the housing. See, for example, U.S. Pat. No. 5,662,545 granted to Zimmerman et al.

SUMMARY

According to some embodiments, a sprinkler can include a stator, a turbine, a nozzle, a gear drive and a reversing mechanism. The gear drive and reversing mechanism can rotatably couple the turbine and the nozzle. The gear drive and reversing mechanism can be coupled to shift a direction of rotation of an output stage of the gear drive. In some embodiments, the stator and turbine can be configured as a low bypass arrangement to allow the majority of the water to pass over the plurality of blades, with no, or low amounts of water bypassing the plurality of blades.

According to some embodiments, a rotating sprinkler for irrigation can include a housing having an inlet and an outlet, a turret mounted on the housing at the outlet and configured to be rotated about an axis relative to the housing, a drive mechanism configured to rotate the turret and having an input shaft, a turbine coupled to the input shaft and having a plurality of blades configured to generate torque for rotating the input shaft, and a stator spaced upstream from the turbine to form a mixing region therebetween. The stator can define a primary flow path and a bypass flow path through the stator. The primary flow path can be aligned relative to the plurality of blades so that water exiting the primary flow path traverses the mixing region and impinges on the plurality of blades at a first angle of attack when flow through the bypass flow path is a first amount. The bypass flow path can be aligned relative to the primary flow path so that water exiting the bypass flow path intersects the water exiting the primary flow path in the mixing region to cause the water exiting the primary flow path to impinge on the plurality of blades at a second angle of attack when the flow through the bypass flow path is a second amount. The second angle of attack and the second amount can be different than the first angle of attack and the first amount, respectively. The rotating sprinkler can further include a valve configured to regulate flow between the primary flow path and the bypass flow path.

In some embodiments, the valve proportions flow between the primary flow path and the bypass flow path.

In some embodiments, at least a portion of the water exiting the bypass flow path combines with at least a portion of the water exiting the primary flow path in the mixing region.

In some embodiments, the water exiting the bypass flow path intersects the water exiting the primary flow path at an oblique angle in the mixing region.

In some embodiments, the valve regulates an amount of the water between the primary flow path and the bypass flow path in response to changes in pressure.

In some embodiments, the valve regulates an amount of the water between the primary flow path and the bypass flow path in response to changes in flow.

In some embodiments, the valve defines a surface of the bypass flow path.

In some embodiments, the valve reciprocates within the stator in response to changes in pressure.

In some embodiments, the valve reciprocates within the stator in response to changes in flow.

In some embodiments, at least one of the primary flow path or the bypass flow path is parallel to the axis.

In some embodiments, at least one of the primary flow path or the bypass flow path is at an angle relative to the axis.

In some embodiments, the stator further includes one or more diverters disposed so as to change a direction of the primary flow path through the stator.

In some embodiments, the stator comprise a manifold, and wherein the one or more diverters are disposed in the manifold.

In some embodiments, the stator comprise a manifold, and wherein the one or more diverters are disposed downstream of the manifold.

In some embodiments, a portion of the one or more diverters is formed by a portion of the valve.

In some embodiments, each of the one or more diverters comprises a first opening and a second opening, and wherein at least a size of the second opening varies as the valve regulates flow between the primary flow path and the bypass flow path.

In some embodiments, the second opening is formed by a portion of the first opening.

In some embodiments, the second opening overlaps at least a portion of the first opening.

In some embodiments, a size of the second opening is greater than a size of the first opening.

In some embodiments, each of the one or more diverters comprises a first opening, and wherein at least a size of the first opening varies as the valve regulates flow between the primary flow path and the bypass flow path.

In some embodiments, an outer perimeter of the mixing region is defined by an inner surface of the housing.

According to some embodiments, a rotating sprinkler for irrigation can include a housing having an inlet and an outlet, a turret mounted on the housing at the outlet and configured to be rotated about an axis relative to the housing, a drive mechanism configured to rotate the turret and having an input shaft, a turbine coupled to the input shaft and having a plurality of blades configured to generate torque for rotating the input shaft, and a stator spaced upstream from the turbine. The stator can define a primary flow path and a bypass flow path through the stator. The primary flow path can be aligned relative to the plurality of blades at a first angle of attack. The bypass flow path can be aligned relative to the primary flow path so that water exiting the bypass flow path intersects the water exiting the primary flow path.

In some embodiments, the rotating sprinkler can further include a valve configured to regulate flow between the primary flow path and the bypass flow path.

In some embodiments, the housing is a tubular structure at least partially disposed in a body. The tubular structure is configured to telescope from the body. The body can be configured for attachment to a riser.

In some embodiments, the drive mechanism is configured to rotate the turret in both a clockwise and a counterclockwise direction about the axis.

In some embodiments, the turbine has a general annular shape with the plurality of blades being disposed around its outer periphery.

In some embodiments, the stator further comprises one or more diverters disposed so as to change a direction of the primary flow path through the stator.

In some embodiments, the stator comprise a manifold, and wherein the one or more diverters are disposed in the manifold.

In some embodiments, the stator comprise a manifold, and wherein the one or more diverters are disposed downstream of the manifold.

In some embodiments, each of the one or more diverters comprises a first opening and a second opening, and wherein at least a size of the second opening can vary during operation of the sprinkler.

According to some embodiments, a rotating sprinkler for irrigation can include a housing having an inlet and an outlet, a turret mounted on the housing at the outlet and configured to be rotated about an axis relative to the housing, a drive mechanism configured to rotate the turret and having an input shaft, a turbine coupled to the input shaft and having a plurality of blades configured to generate torque for rotating the input shaft, and a stator spaced upstream from the turbine. The stator can define a primary flow path and a bypass flow path that together impinge on the plurality of blades. The primary flow path and the bypass flow path can be aligned relative to each other so that as a flow of water increases through the inlet, an angle of attack with the plurality of blades decreases. The rotating sprinkler can further include a valve configured to regulate flow between the primary flow path and the bypass flow path.

In some embodiments, the primary flow path and the bypass flow path are aligned relative to each other so that as the flow of water increases through the inlet, a rate of rotation of the turret about the axis is relatively stable.

In some embodiments, the primary flow path and the bypass flow path are aligned relative to each other so that as the flow of water increases through the inlet, an amount of torque created by the turbine increases.

In some embodiments, the rotating sprinkler further includes a mixing region formed between the stator and the turbine. At least a portion of the valve can be disposed in the mixing region when the valve is in an open position.

In some embodiments, the stator further comprises one or more diverters disposed so as to change a direction of the primary flow path through the stator.

In some embodiments, the stator comprise a manifold, and wherein the one or more diverters are disposed in the manifold.

In some embodiments, the stator comprise a manifold, and wherein the one or more diverters are disposed downstream of the manifold.

In some embodiments, a portion of the one or more diverters is formed by a portion of the valve.

In some embodiments, each of the one or more diverters comprises a first opening, and wherein at least a size of the first opening varies as the valve regulates flow between the primary flow path and the bypass flow path.

In some embodiments, each of the one or more diverters comprises a first opening and a second opening, and wherein at least a size of the second opening varies as the valve regulates flow between the primary flow path and the bypass flow path.

In some embodiments, the second opening is formed by a portion of the first opening.

In some embodiments, the second opening overlaps at least a portion of the first opening.

In some embodiments, a size of the second opening is greater than a size of the first opening.

According to some embodiments, a rotating sprinkler for irrigation comprises a housing having an inlet and an outlet, a turret mounted on the housing at the outlet and configured to be rotated about an axis relative to the housing, a drive mechanism configured to rotate the turret and having an input shaft, a turbine coupled to the input shaft and having a plurality of blades configured to generate torque for rotating the input shaft, a stator spaced upstream from the turbine and having one or more diverters, the stator defining a primary flow path and a bypass flow path that together impinge on the plurality of blades, the one or more diverters being disposed so as to change a direction of the primary flow path through the stator and forming at least a portion of one or more openings, and a valve configured to change a size of the one or more openings by regulating flow between the primary flow path and the bypass flow path.

In some embodiments, a portion of the one or more diverters is formed by a portion of the valve.

BRIEF DESCRIPTION OF THE DRAWINGS

FIG. 3 is a front elevation view of the sprinkler of FIG. 2.

FIG. 4 is a top view of the sprinkler of FIG. 3.

FIG. 5 is a section view of the sprinkler of FIG. 3 cut along the cut line 5-5 of FIG. 4.

FIG. 7 is the front view of the turbine from FIG. 6.

FIG. 8 is a top view of the turbine of FIG. 7.

FIG. 9 is an orthographic view of the turbine of FIG. 8.

DETAILED DESCRIPTION

Irrigation sprinklers can be used to distribute water to turf and other landscaping. Types of irrigations sprinklers include pop-up, rotor-type, impact, spray and/or rotary-stream sprinklers. In some applications, multiple irrigation sprinklers can be used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of time the sprinklers operate.

According to the present disclosure, as illustrated and described below, a rotor-type sprinkler can include a stator to direct water to a turbine. The turbine can be connected to the input of a gear drive mechanism to drive a turret in a circular fashion at a desired speed to properly distribute water over an irrigated area. The stator can be configured to allow different amounts of water to flow through the plurality of blades as more or less water is required by the sprinkler. As described below, the angle of attack where the water impinges on the plurality of blades can vary dependent on the amount of water required by the sprinkler.

In certain embodiments disclosed herein, most or all of the additional water required by the sprinkler flows to and impinges on the plurality of blades to provide additional torque. However, in certain embodiments, the sprinkler keeps the speed of rotation of the turret reasonably constant by reducing an angle of attack where the water impinges on the plurality of blades as the water flow increases through the sprinkler. As more water impinges on the plurality of blades, the mass of the additional water impinging on the plurality of blades increases the torque while the angle of attack of the larger amount of water hitting the plurality of blades is reduced keeping the turbine from over spinning.

Figure 1:
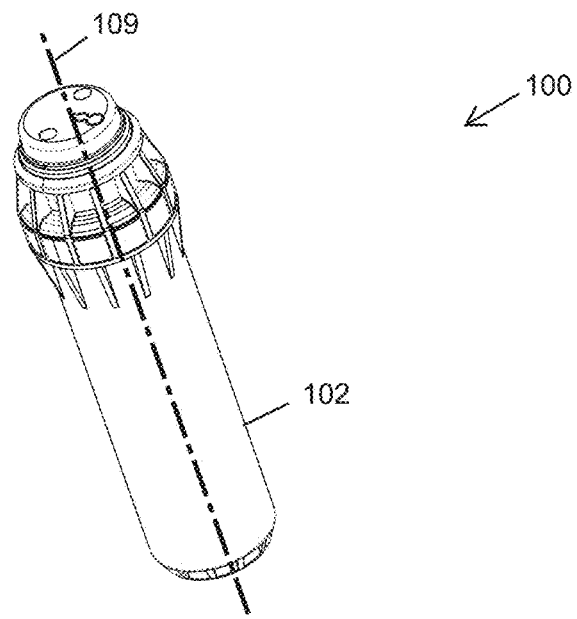
FIG. 1 is a view of an assembled gear driven sprinkler that includes an outer body and a tubular structure in a retracted position within the outer body according to a preferred embodiment of the present invention.
Figure 2:
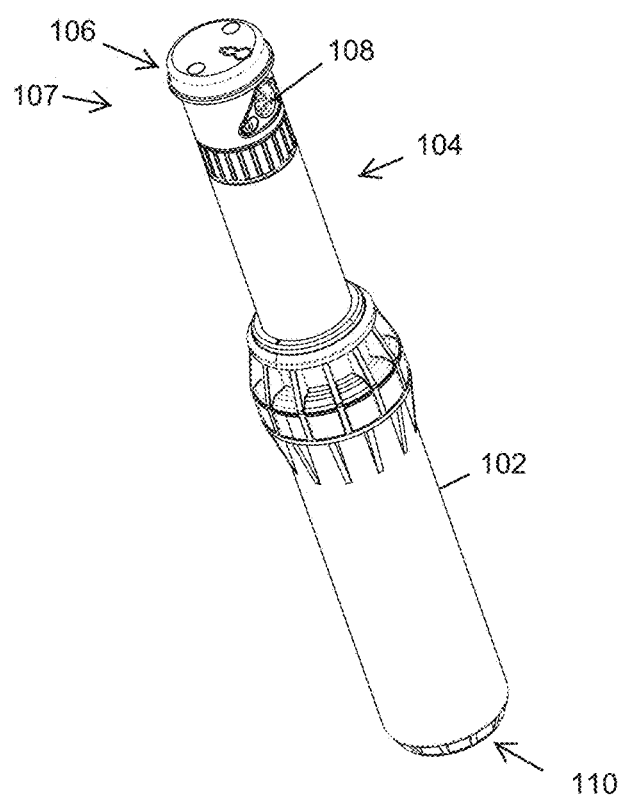
FIG. 2 is similar to FIG. 1 except the tubular structure has moved to an extended position relative to the outer body.

FIG. 1 is a view of an assembled gear driven sprinkler 100 according to a preferred embodiment of the present invention. In certain embodiments, the sprinkler 100 includes an outer body 102 and a tubular structure 104. The sprinkler 100 further includes an inlet 110 for water to enter the sprinkler 100 and an outlet 107. In FIG. 1, the tubular structure 104 is in a retracted position within the outer body 102. FIG. 2 is similar to FIG. 1 except the tubular structure 104 has moved to an extended position relative to the outer body 102. As is illustrated in FIG. 2, the sprinkler 100 includes a turret 106 mounted at the outlet 107. In certain embodiments, the turret 106 supports a nozzle 108 configured to spray water from the sprinkler 100. In certain embodiments, the turret 106 is configured to rotate about an axis 109 of the tubular structure 104 to allow the nozzle 108 to distribute the water across the turf or other landscaping.

In other embodiments, the tubular structure 104 is fixed relative to the outer body 102 with the turret 106 and the nozzle 108 exposed above the outer body 102 and rotatable about the axis 109. Thus, the tubular structure 104 need not move between the retracted position and the extended position in certain embodiments.

In certain embodiments, the tubular structure 104 can extend away from the outer body 102 to the extended position when water pressure is applied to the inlet 110 and then retract to the retracted position when the water pressure is removed. In certain embodiments, the tubular structure 104 is at least partially retracted back into the outer body 102 when in the retracted position.

FIG. 3 is a front elevation view of the sprinkler 100 of FIG. 2. In the illustrated embodiment, the tubular structure 104 is in the extended position with the nozzle 108 of the turret 106 rotated about the axis 109 to face to the right in FIG. 3. FIG. 4 is a top view of the sprinkler 100 of FIG. 3. FIG. 5 is a section view of the sprinkler 100 of FIG. 3 cut along the cut line 5-5 of FIG. 4. In the embodiment of the sprinkler 100 illustrated in FIG. 5, a portion of the tubular structure 104 is extended away from the outer body 102.

In certain embodiments, the sprinkler 100 includes a spring 112. In certain embodiments, the spring 112 is configured to bias the tubular structure 104 to move toward the retracted position. In certain embodiments, the spring 112 has a spring constant which causes the spring 112 to compress when the inlet 110 is pressurized with water and retract in the absence of pressurized water. For example, the spring 112 is compressed when the tubular structure 104 is in the position illustrated in FIG. 5. When the water pressure is removed, the spring 112 expands to force the tubular structure 104 to lower back at least partially into the outer body 102 to a position shown in FIG. 1.

In certain embodiments, the sprinkler 100 can contain a screen 114 configured to filter the water entering the inlet 110. In the illustrated embodiment, the screen 114 is disposed in the tubular structure 104. In certain embodiments, the screen 114 is disposed downstream of the inlet 110 to prevent some dirt, rocks, algae, and other materials from flowing with the water through the sprinkler 100.

The sprinkler 100 comprises a stator 116 and a turbine 118. The structures of the stator 116 and the turbine 118 illustrated in FIG. 5 are only exemplary. In other embodiments, the stator 116 and/or the turbine 118 can have different structures and different arrangements of structures. For example, various embodiments of the stator 116, 216, 316 are illustrated in FIG. 5, FIGS. 24-30 and FIGS. 31-35. Thus, the scope of the claims appended hereto is not limited by any of the particular embodiments described herein.

In certain embodiments, the turbine 118 is located downstream of the stator 116. In this way, in certain embodiments, water enters the turbine 118 after passing through and/or by the stator 116. In certain embodiments, at least some of the water that passes through the stator 116 also passes through the turbine 118. In certain embodiments, at least some of the water that passes through the turbine 118 did not pass through the stator 116. In certain embodiments, the amount of water that passes through the stator 116 and that also passes through the turbine 118 varies depending on, for example, one or more of variations in flow rate, variations in water pressure, changes in size of the nozzle 108, and changes in rotation rate of the turret 106. In certain embodiments, a mixing region 119 is defined between at least a portion of the stator 116 and at least a portion of the turbine 118.

Figure 6:
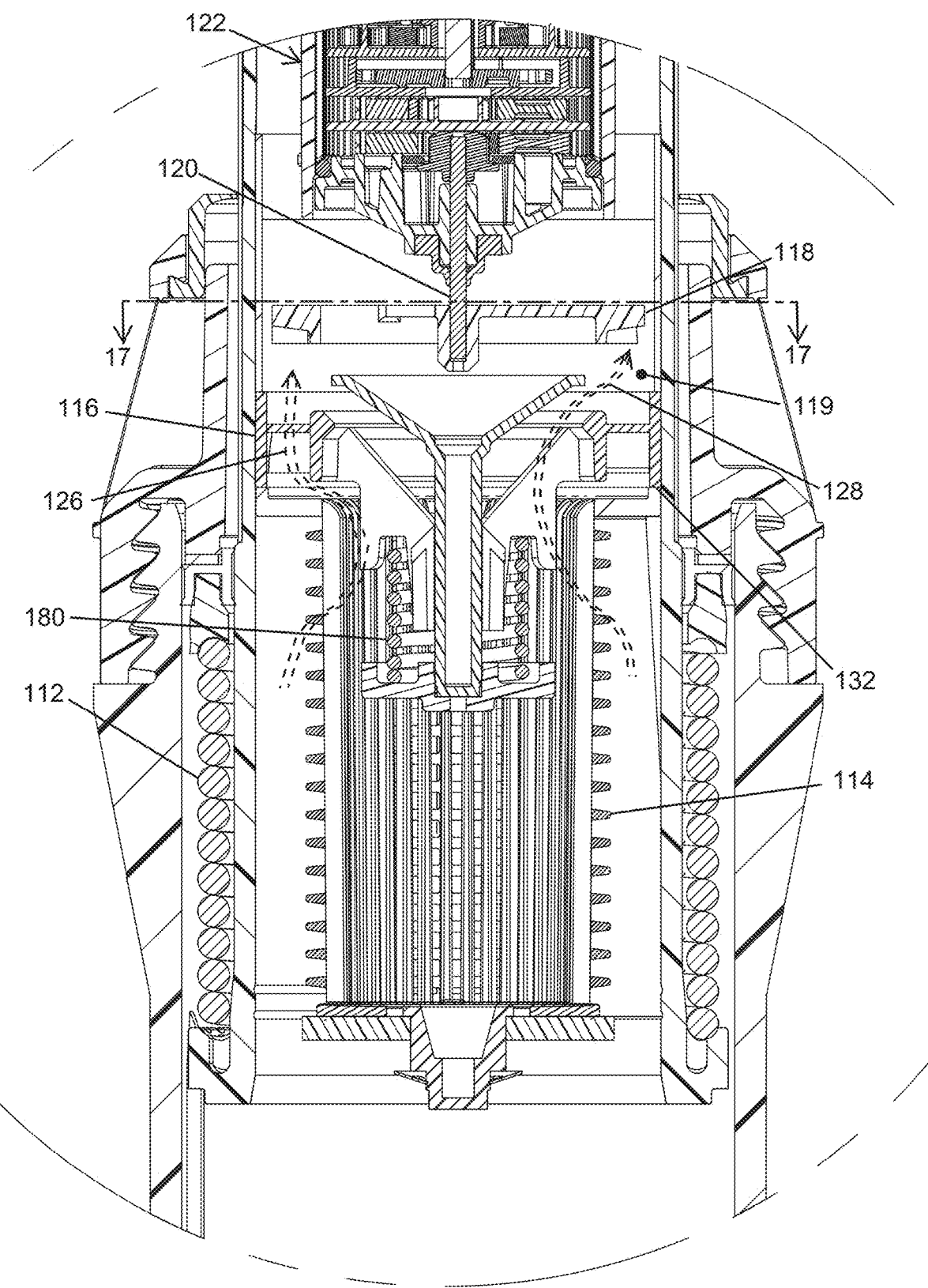
FIG. 6 is an enlarged detail 6 from FIG. 5 showing a turbine and a stator.

FIG. 6 is an enlarged detail 6 from FIG. 5 showing the turbine 118 and the stator 116. In certain embodiments, the turbine 118 is coupled to an input shaft 120. Rotation of the turbine 118 will drive rotation of the input shaft 120. In certain embodiments, the input shaft 120 is further coupled to a gear drive 122. In certain embodiments, the turbine 118 is coupled to the input shaft 120 which causes the gears inside the gear drive 122 to rotate. In the illustrated embodiment, the gear drive 122 and the turbine 118 are disposed on opposite ends of the input shaft 120.

In certain embodiments, the sprinkler 100 includes a reversing mechanism 124. In certain embodiments, the reversing mechanism 124 includes structure to cause the sprinkler 100 to oscillate between a clockwise rotation and a counterclockwise rotation. In certain embodiments, the sprinkler 100 oscillates through an arc defined between set points. In certain other embodiments, the sprinkler 100 does not include the reversing mechanism 124. In embodiments that do not include the reversing mechanism 124, the sprinkler 100 can rotate in a continuous rotation.

In certain embodiments, the gear drive 122 or the reversing mechanism 124 is coupled to the turret 106. In certain embodiments, the nozzle 108 is positioned in the turret 106. In some embodiments, pressurized water exits the nozzle 108 while the turret 106 is being rotated by the gear drive 120 to distribute water over a defined area of the landscape. Some or all the components of the sprinkler 100 can be generally made of injection molded plastic.

In a typical turbine, the rotational speed will increase if the flow of water increases through the turbine. This increase in flow through the turbine can be caused by, for example, an increase in an orifice size of the spray nozzle and/or an increase in inlet water pressure. For example, the sprinkler may be supplied with more than one selectable nozzle size. As different nozzle sizes are installed in the rotating turret, more or less water is required to water the landscape. In either case, the change in flow rate caused by a change in orifice size or inlet water pressure changes the flow across the turbine which changes the rotational speed. Sprinklers that exhibit fluctuations in the rotational speed of their turret create non-uniform water patterns in the irrigated area. Accordingly, it is desirable that a turbine driven sprinkler provide a substantially uniform rate of rotation for variable ranges of pressure and flow. As explained below, the turbine 118 and stator 116 illustrated in FIG. 6 mitigate against increases in rotational speed of the turbine 118 even when the flow rate though the sprinkler 100 is increased.

As is illustrated in FIG. 6, the stator 116 is installed upstream of the turbine 118. In certain embodiments, the stator 116 comprises a primary flow path 126 and a bypass flow path 128. In certain embodiments, the sprinkler 100 regulates water flow between the primary flow path 126 and the bypass flow path 128. In certain embodiments, the sprinkler 100 includes a valve 130 to regulate flow. In certain embodiments, the valve 130 is configured to regulate a cross-sectional flow area of one or both of the primary flow path 126 and the bypass flow path 128. In certain embodiments, the valve 130 is disposed upstream of the turbine 118.

In the illustrated embodiment, the valve 130 is disposed within the stator 116. Of course, the valve 130 need not be disposed within the stator 116 to regulate water flow between the primary flow path 126 and the bypass flow path 128. For example, the valve 130 can be disposed within the screen 114.

In certain embodiments, water exiting the primary flow path 126 and water exiting the bypass flow path 128 of the stator 116 enter the mixing region 119 at different angles and/or locations. In certain embodiments, this difference in angles and/or locations allows the water from the primary flow path 126 and water from the bypass flow path 128 to collide or intersect with each other before reaching the turbine 118. In certain embodiments, a combined or hybrid flow resulting from the collision or intersection of the primary flow path 126 with the bypass flow path 128 in the mixing region 119 has a heading or flow path across the mixing region 119 that is a combination of the heading of the water exiting the primary flow path 126 with the heading of the water exiting the bypass flow path 128. In certain embodiments, the resulting combination is proportional to the respective flow rates. In certain embodiments, the resulting combination is not proportional to the respective flow rates. In certain embodiments, the combined or hybrid flow has a flow rate that is not the same as either the flow rate of the water exiting the primary flow path 126 or the flow rate of the water exiting the bypass flow path 128. In certain embodiments, the combined or hybrid flow has a flow rate that is greater than each of the flow rate of the water exiting the primary flow path 126 and the flow rate of the water exiting the bypass flow path 128.

In certain embodiments, the mixing region 119 is defined between at least a portion of the stator 116 and at least a portion of the turbine 118. As is illustrated in FIG. 6, the mixing region 119 extends from a top surface of the stator 116 to a bottom surface of the turbine 118.

In certain embodiments, an upper end of the screen 114 abuts against an annular shoulder 132 of the stator 116. In certain embodiments, a lower end of the screen 114 rests against an inner annular shoulder 134 of the inlet 110 when the tubular structure 104 is in the retracted position (FIG. 5).

FIG. 7 is the front view of the turbine 118 from FIG. 6. FIG. 8 is a top view of the turbine 118 of FIG. 7. In certain embodiments, the turbine 118 comprises a body 136 configured to rotate about the axis 109. In other embodiments, the body 136 rotates about an axis different than the axis 109. In the illustrated embodiment, the body 136 has an annular shape. In other embodiments, the body 136 has a different shape. In certain embodiments, the turbine 118 includes one or more spokes 138. In the illustrated embodiment, the one or more spokes 138 connect a center portion 140 of the turbine 118 with the body 136. In the illustrated embodiment, the turbine 118 includes three spokes 138 equally spaced apart about the body 136. Of course, the turbine can include more or fewer than three spokes 138 with variations in spacing between adjacent spokes 138. In some embodiments, a disk can connect the center portion 140 of the turbine 118 with the body 136. In some embodiments, the disk can be a solid disc. In some embodiments, one or more through holes can be displaced in the disc, In the illustrated embodiment, a boss 142 disposed in the center portion 140 couples the turbine 118 to the input shaft 120.

FIG. 9 is an orthographic view of the turbine 118 of FIG. 8. In certain embodiments, the one or more spokes 138 have a circular cross-sectional shape. In the illustrated embodiment, each of the one or more spokes 138 has a tapering rectangular shape in a direction from the center portion 140 to the body 136. Of course, the one or more spokes 138 can have any other shape.

The turbine 118 comprises a power section 144 and a bypass section 146. The power section 144 is configured for water passing through the power section 144 to drive rotation of the turbine 118. The bypass section 146 is configured to allow water to pass through the turbine 118 without significantly driving rotation of the turbine 118. In the illustrated embodiment, the bypass section 146 is disposed within an area of the turbine 118 within the annular body 136. In certain embodiments, the bypass section 146 is area is defined in part by adjacent spokes 138. In the illustrated embodiment, the power section 144 is disposed outside of the annular body 136. For example, the power section 144 can be at least a portion of a region defined between the outer circumference of the body 136 and the inner surface of the tubular structure 104. In certain embodiments, locating the power section 144 further from the input shaft 120 than the bypass section 146 increases torque on the input shaft 120. In contrast, certain embodiments that have the power section 144 closer to the input shaft 120 will generate less torque.

In certain embodiments, the power section 144 comprises a plurality of blades 148. For example, in certain embodiments, the plurality of blades 148 extend in an outward radial direction from the body 136. In other embodiments, the plurality of blades 148 extend in an inward radial direction from the body 136. In the illustrated embodiment, the plurality of blades 148 are disposed about an outer periphery of the body 136. In certain embodiments, at least some of the plurality of blades 148 are disposed at an angle 150 relative to a flow direction 152. In certain embodiments, at least some of the plurality of blades 148 are disposed at a first angle 150 and some of the plurality of blades 148 are disposed at a second angle 150 different than the first angle 150. In certain embodiments, some blades of the plurality of blades 148 have at least two surfaces at different angles 150. In certain embodiments, the plurality of blades 148 have a curved surface. In certain embodiments, the angle 150 is non-zero (e.g., between endpoints 0 and 90 degrees). In this way, water passing through the power section 144 along the flow direction 152(a) drives rotation of the turbine 118.

In certain embodiments, the angle 150 of the plurality of blades 148 is zero or parallel to the axis 109. In this way, for water passing through the power section 144 to drive rotation of the turbine 118, the flow direction 152 need only be greater than zero relative to axis 109 (e.g., flow direction 152(b). In the illustrated embodiment, the angle 150 of the plurality of blades 148 is non-zero relative to the axis 109. The illustrated flow directions 152 are for exemplary purposes only. For example, in certain embodiments, the sprinkler 100 need not operate at the flow direction 152(a).

In certain embodiments, the sprinkler 100 changes the flow direction 152 from at least a first flow direction to a second flow direction at different points over the operating flow range of the sprinkler 100. In other embodiments, the number of flow directions 152 is greater than two flow directions (e.g., the first flow direction and the second flow direction). In certain embodiments, the sprinkler 100 gradually changes the flow direction 152 over the operating flow range of the sprinkler 100. For example, in certain embodiments, the sprinkler 100 slowly shifts the flow direction 152 from the flow direction 152(b) towards the flow direction 152(a) as the flow rate through the sprinkler 100 increases. In this way, in certain embodiments, the effective angle 150 of the plurality of blades 138 relative to the flow direction 152 changes over the operating range of the sprinkler 100 due to the changing flow direction 152.

In certain embodiments, the plurality of blades 148 have a variable pitch. For example, in certain embodiments, the plurality of blades 148 are rotatably or flexibly coupled to the body 136 so as to rotate from at least a first pitch angle to a second pitch angle. In certain embodiments, each of the plurality of blades 148 are biased to the first pitch angle (e.g., 45 degrees) by a spring. In some cases, the plurality of blades are formed of a material at a thickness that causes them to flex as flow past them increases. As the flow increases through the power section 144, the increasing pressure on the plurality of blades 148 overcomes the biasing force and rotates the plurality of blades 148 to the second pitch angle (e.g., greater than 45 degrees). In this way, in certain embodiments, the effective angle 150 of the plurality of blades 148 relative to the flow direction 152 changes over the operating range of the sprinkler 100 due to the changing pitch of the plurality of blades 148.

Figure 10:
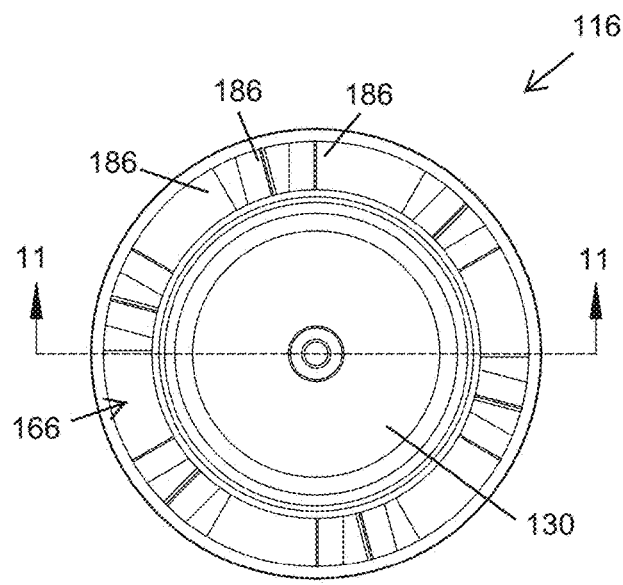
FIG. 10 is a top view of the stator.

FIG. 10 is a top plan view of the stator 116 and the valve 130 assembled to the stator 116. In the illustrated embodiment, the valve 130 is disposed coaxially with the stator 116. In other embodiments, the valve 130 is laterally offset from the stator 116. In the illustrated embodiment, the stator 116 is located downstream of the inlet 110 and upstream from the turbine 118. In certain embodiments, the valve 130 is configured to move with respect to the stator 116. In certain embodiments, the stator 116 is configured to move with respect to the valve 130. In certain embodiments, the valve 130 moves in an axial direction relative to the stator 116. In certain embodiments, the valve 130 reciprocates within the stator 116 in response to changes in pressure and/or flow.

Figure 11:
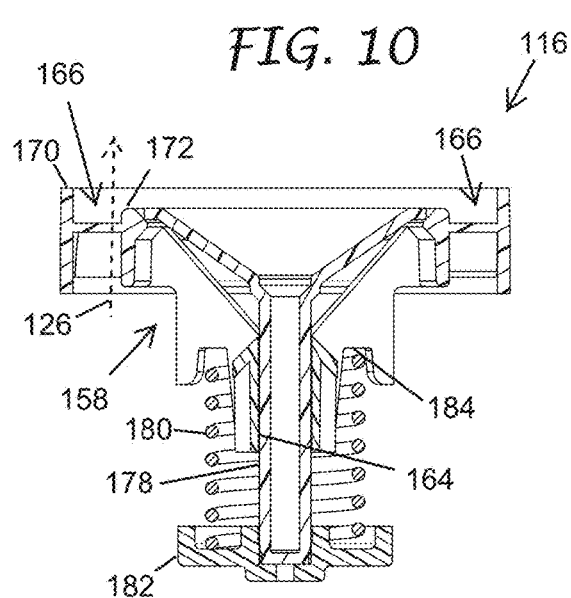
FIG. 11 illustrates a front section view of the stator as seen by the cut line 11-11 of FIG. 10 with a valve in a closed position.
Figure 12:
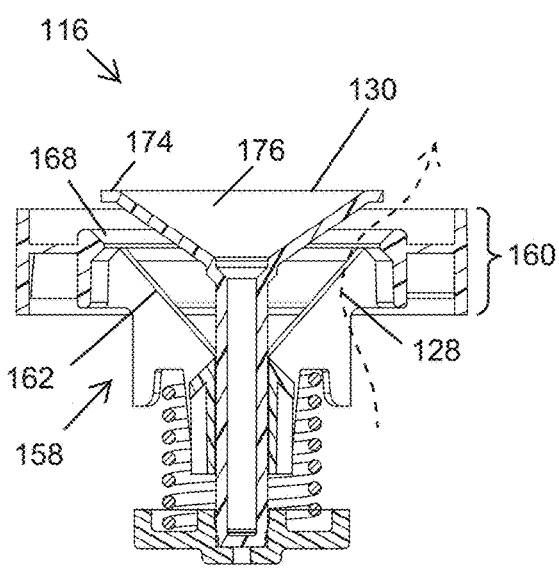
FIG. 12 is similar to FIG. 11 except the valve is in an open position.

FIG. 11 illustrates a front section view of the stator 116 as seen by the cut line 11-11 of FIG. 10 with the valve 130 in a closed position. FIG. 12 is similar to FIG. 11 except the valve 130 is in an open position. In the illustrated embodiment, the valve 130 has a substantially funnel shape. In certain embodiments, the valve 130 is formed by an inwardly extending conical portion 176 joined to an elongated tubular portion 178. In certain embodiments, the valve 130 comprises a lip 174 extending in an outward direction from the conical portion 176. In certain embodiments, the valve 130 comprises a retainer 182 coupled to an end of the elongated tubular portion 178. In certain embodiments, the retainer 182 is coupled to the elongated tubular portion 178 by a press fit. In certain embodiments, the retainer 182 is coupled to the elongated tubular portion 178 by a spin weld joint. In certain embodiments, the retainer 182 is coupled to the elongated tubular portion 178 by an ultrasonic weld. In certain embodiments, the retainer 182 is coupled to the elongated tubular portion 178 by an adhesive or solvent. In certain embodiments, the retainer 182 is coupled to the elongated tubular portion 178 by a snap fit.

In certain embodiments, the valve 130 is biased to move to the closed position with respect to the stator 116. For example, in certain embodiment, a spring 180 or other elastic member biases the valve 130 to the closed position. In the illustrated embodiment, the elongated tubular portion 178 of the valve 130 is disposed in a center of the spring 180. In certain embodiments, the spring 180 is seated between a portion of the stator 116 and a portion of the valve 130. For example, in the illustrated embodiment, the spring 180 is seated between the retainer 182 and an annular groove 184 in a lower surface of the stator 116. In operation, the spring 180 is compressed between the annular groove 184 and the retainer 182 when the valve 130 moves to the open position (FIG. 12).

The stator 116 comprises a housing 158. In certain embodiments, the housing 158 has a substantially funnel shape with an upper portion 160 having an inwardly extending conical section 162 joined to an elongated tubular section 164. In certain embodiments, the housing 158 is sized so as to receive at least a portion of the valve 130. For example, in certain embodiments, at least portions of the conical section 162 and the tubular section 164 are sized to receive therein portions of the conical portion 176 and the tubular portion 178.

In the illustrated embodiment, the upper portion 160 of the stator 116 comprises a manifold 166. In certain embodiments, the manifold 166 has an annular shape. In certain embodiments, the manifold 166 has a circular shape. In certain embodiments, the manifold 166 is disposed about the outer periphery of the stator 116. In certain embodiments, the manifold 166 is centered within the stator 116. In the illustrated embodiment, the manifold 166 is formed between an outer wall 170 and an inner wall 172 of the stator 116. In certain embodiments, the stator 116 comprises a valve seat 168 disposed on the inner wall 172. The valve seat 168 can be positioned so as to contact the lip 174 of the valve 130. In the illustrated embodiment, an underside surface of the lip 174 contacts the valve seat 168 when the valve 130 is in the closed position (FIG. 11).

In certain embodiments, the stator 116 defines a primary flow path 126 and a bypass flow path 128 through the stator 116. The pathways of the primary flow path 126 and the bypass flow path 128 illustrated in FIGS. 11 and 12 are only exemplary. In other embodiments, the primary flow path 126 and the bypass flow path 128 can follow different path than are illustrated. For example, various embodiments of the primary flow path 126, 226, 326 and the bypass flow path 128, 228, 328 are illustrated in FIG. 6, FIGS. 24-30 and FIGS. 31-35. Thus, the scope of the claims appended hereto is not limited by any of the particular embodiments described herein. In certain embodiments, the primary flow path 126 provides a passage for water entering the inlet 110 to pass through the stator 116 and/or the valve 130 before entering the mixing region 119. In the illustrated embodiment, the primary flow path 126 provides a passage for water entering the inlet 110 to pass through the stator 116 before entering the mixing region 119. In the illustrated embodiment, the primary flow path 126 is open when the valve 130 is in either the closed position (FIG. 11) or the open position (FIG. 12). In certain embodiments, the manifold 166 forms at least a portion of the primary flow path 126.

In certain embodiments, the bypass flow path 128 provides a passage for water entering the inlet 110 to pass through the stator 116 and/or the valve 130 before entering the mixing region 119. In the illustrated embodiment, the bypass flow path 128 provides a passage for water entering the inlet 110 to pass between the stator 116 and the valve 130 before entering the mixing region 119. In the illustrated embodiment, the bypass flow path 128 is open when the valve 130 is in the open position (FIG. 12).

In certain embodiments, the primary flow path 126 and the bypass flow path 128 are entirely separate flow paths within the stator 116 and/or the valve 130. In certain other embodiments, the primary flow path 126 and the bypass flow path 128 have one or more connections or flow paths therebetween and within the stator 116 and/or the valve 130. In certain embodiments, the bypass flow path 128 is formed between the valve seat 168 of the stator 116 and the lip 174 of the valve 130. In certain embodiments, exits from the primary flow path 126 and the bypass flow path 128 are arranged relative to each other so that water exiting the primary flow path 126 and water exiting the bypass flow path 128 intersect or collide in the mixing region 119. In certain embodiments, one of the primary flow path 126 or the bypass flow path 128 enters the mixing region 119 parallel to the axis 109 with the other one of the primary flow path 126 or the bypass flow path 128 entering the mixing region 119 non-parallel to the axis 109. In certain embodiments, both of the primary flow path 126 and the bypass flow path 128 enter the mixing region 119 non-parallel to the axis 109. In certain embodiments, the combined or hybrid flow resulting from the collision or intersection of the primary flow path 126 with the bypass flow path 128 in the mixing region 119 follows the flow direction 152 into the turbine 118 (see FIG. 7).

In certain embodiments, the stator 116 comprises one or more diverters 186. In certain embodiments, the one or more diverters 186 are disposed in the primary flow path 126 and/or the bypass flow path 128. In the illustrated embodiment, the one or more diverters 186 are disposed in the manifold 166 of the primary flow path 126 (FIG. 10). In certain embodiments, the one or more diverters 186 are arranged relative to the primary flow path 126 to change a heading or flow direction of water exiting the primary flow path 126 and entering the mixing region 119. In certain embodiments, the one or more diverters 186 have the same shape. In other embodiments, one or more of the one or more diverters 186 have different shapes.

In the illustrated embodiment, the one or more diverters 186 form twelve passages through the manifold 166. Of course, the one or more diverters 186 can form more or less than twelve passages through the manifold 166. In the illustrated embodiment, the one or more diverters 186 include two groups of diverters disposed in the manifold 166. Of course, the stator 116 can include more than two groups of diverters. In certain embodiments, the one or more diverters can have different shapes. In some embodiments, the one or more diverters can have the same shape. In certain embodiments, the one or more diverters 186 change the heading or flow direction of water that enters the manifold 166 along the primary flow path 126 and parallel to the flow direction 152(*a*) to the flow direction 152(*b*) (FIG. 7) when the same water exits the manifold 166.

Figure 13:
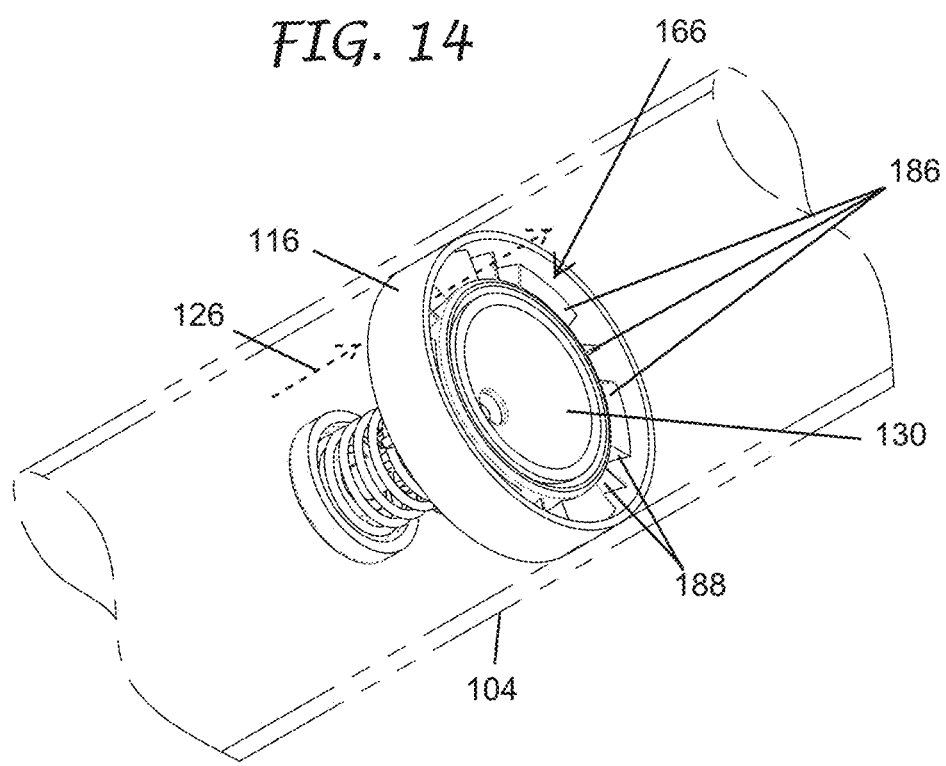
FIG. 13 is a perspective view of the stator installed in the sprinkler with the valve in the closed position.

FIG. 13 is a perspective view of the stator 116 installed in the tubular structure 104 of the sprinkler 100 with the valve 130 in the closed position. In the illustrated embodiment, the primary flow path 126 passes between adjacent diverters of the one or more diverters 186 in the manifold 166. In the illustrated embodiment, the one or more diverters 186 include angled surfaces 188 that change the heading or flow direction of water that passes through the manifold 166 along the primary flow path 126.

Figure 14:
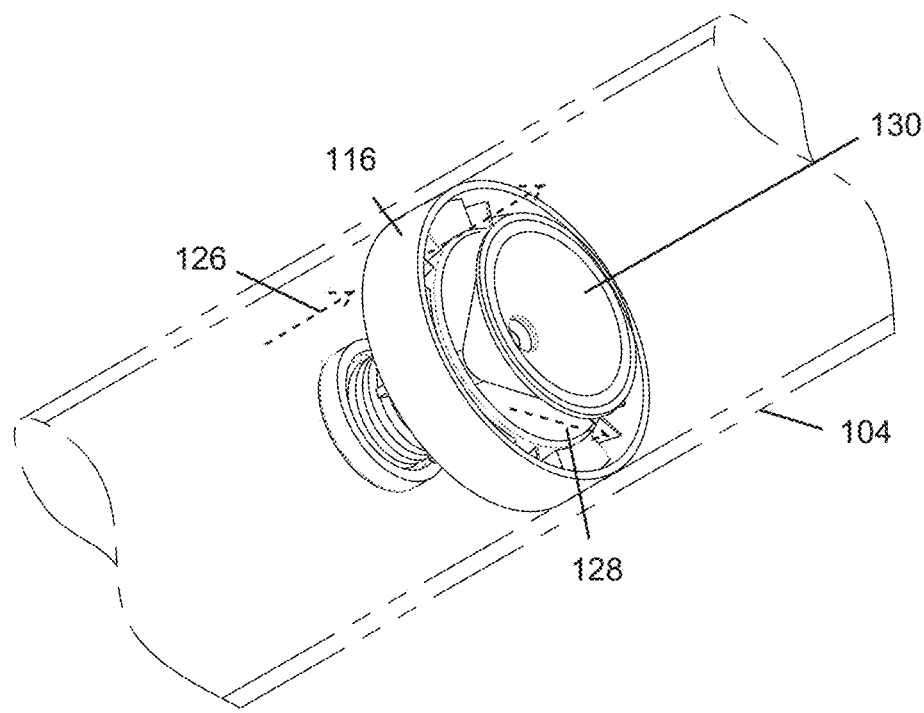
FIG. 14 is similar to FIG. 13 except the valve is in the open position.

FIG. 14 is similar to FIG. 13 except the valve 130 is in the open position. In the illustrated embodiment, water in the primary flow path 126 passes between adjacent diverters of the one or more diverters 186 in the manifold 166 at the same time water in the bypass flow path 128 passes between the valve seat 168 of the stator 116 and the lip 174 of the valve 130. In the illustrated embodiment, the valve seat 168 of the stator 116 and the lip 174 of the valve 130 cause the water exiting the bypass flow path 128 to collide or intersect with the water exiting the primary flow path 126.

Figure 15:
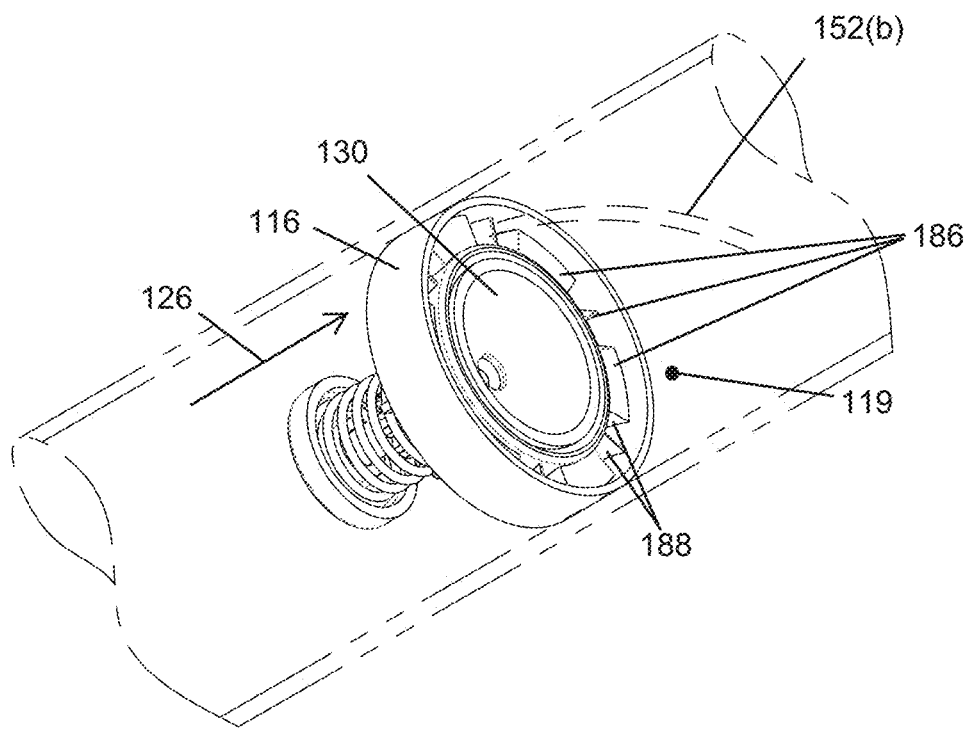
FIG. 15 illustrates the stator as it is installed in the sprinkler with the valve in the closed position causing water flow along a primary flow path out of one or more diverters and into a mixing region before contacting the plurality of blades of the turbine at a first angle of attack.

FIG. 15 illustrates the stator 116 as it is installed in the sprinkler 100 with the valve 130 in the closed position causing water flow along the primary flow path 126 out of the one or more diverters 186 and into the mixing region 119 before contacting the one or more plurality of blades 148 of the turbine 118 at a first angle of attack. In certain embodiments, the angled surfaces 188 direct the water exiting the primary flow path 126 to follow the flow direction 152(*b*) into the mixing region 119. Depending on whether the water following the primary flow path 126 collides or intersects with water exiting the bypass flow path 128, the flow direction 152 into the turbine 118 can vary. For example, in FIG. 15, the bypass flow path 128 is closed so that the water exiting from between the one or more diverters 186 impinges on the turbine 118 at a first angle of attack. An angle of attack is measured between the flow direction into the turbine 118 and a line passing through a cord of the blade of the plurality of blades 148. In certain embodiments, the line through the cord of the blade is defined by the blade angle 150. In certain embodiments where the bypass flow path 128 is closed, the angle of attack is defined in part by a combination of the heading of the water exiting the primary flow path 126 with the blade angle 150.

Figure 16:
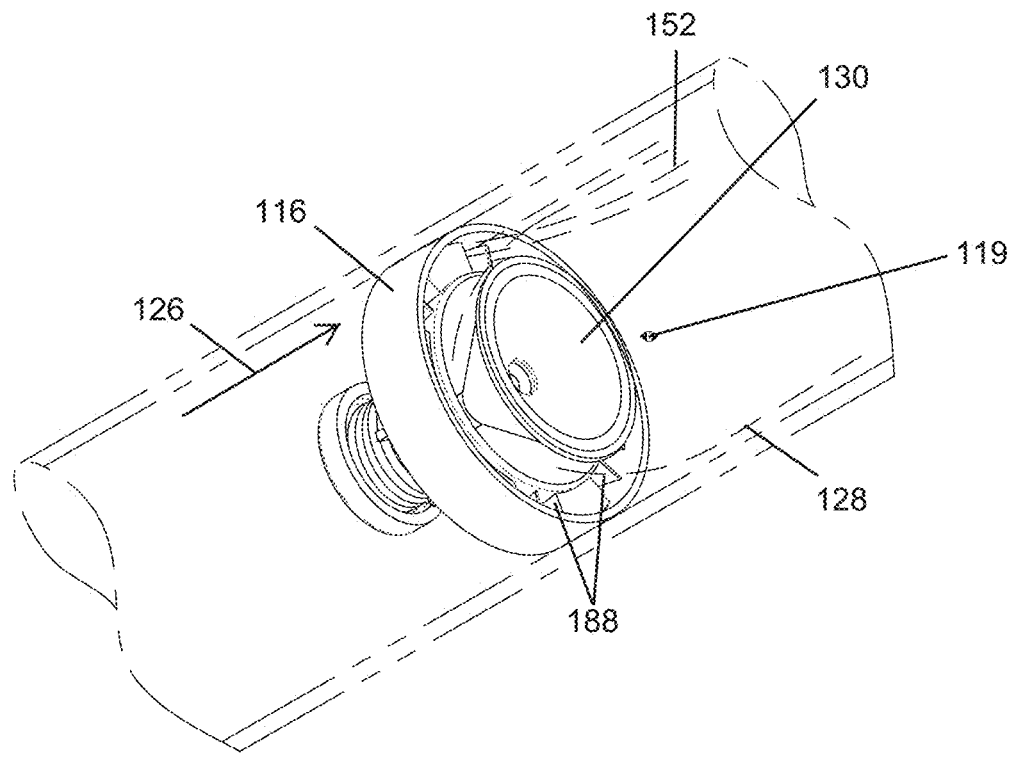
FIG. 16 is similar to FIG. 15 except the valve is in the open position opening a bypass flow path through the stator for water to intersect in the mixing region with the water exiting the primary flow path and change the first angle of attack to a second angle of attack.

FIG. 16 is similar to FIG. 15 except the valve 130 is in an open position opening the bypass flow path 128 through the stator 116 for water to intersect in the mixing region 119 with the water exiting the primary flow path 126 and change the first angle of attack to a second angle of attack. In the illustrated embodiment, the water exits the bypass flow path 128 in a downstream, outward, radial direction. In certain embodiments, the water exits the bypass flow path 128 substantially parallel to one or both surfaces of the valve seat 168 of the stator 116 and the lip 174 of the valve 130. In certain embodiments, the bypass flow path 128 is not open unless the primary flow path 126 is open. In certain other embodiments, the bypass flow path 128 is at least partially open even when the primary flow path 126 is closed. In the illustrated embodiment of FIG. 16, the bypass flow path 128 and the primary flow path 126 are both open. In the illustrated embodiment, the water following the bypass flow path 128 collides or intersects with the water exiting the primary flow path 126. In certain embodiments, the resulting combined or hybrid flow in the mixing region 119 has a heading or flow path across the mixing region 119 that is a combination of the heading of the water exiting the primary flow path 126 with the heading of the water exiting the bypass flow path 128. In this way, the combined or hybrid flow impinges on the turbine 118 at the second angle of attack. In certain embodiments where the bypass flow path 128 is open, the second angle of attack is defined in part by a combination of the heading of the water exiting the primary flow path 126, the heading of the water exiting the bypass flow path 128, and the blade angle 150.

Figure 17:
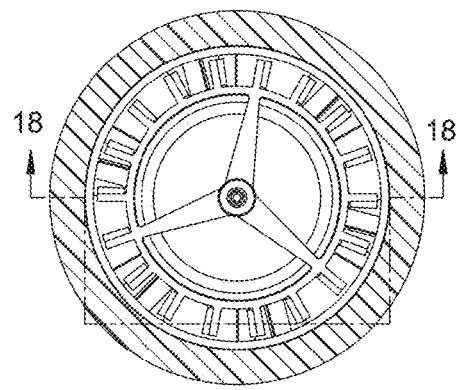
FIG. 17 is a section view taken along line 17-17 in FIG. 6 and shows a plan view of the turbine disposed above and coaxially aligned with the stator.
Figure 18:
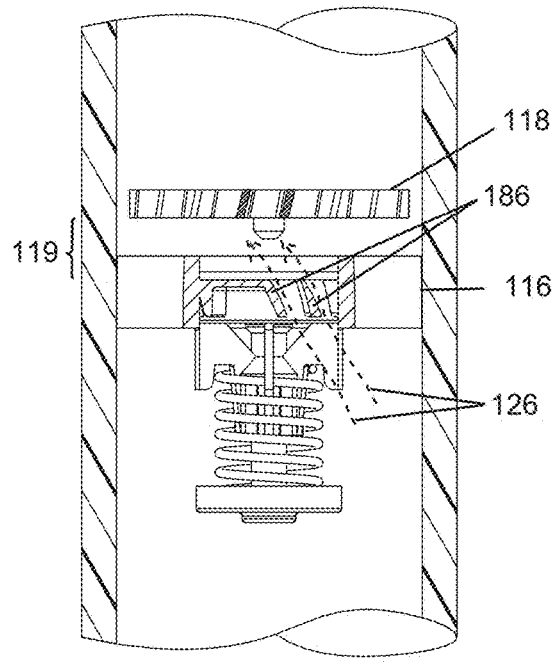
FIG. 18 is a section view taken at the cut line 18-18 of FIG. 17 showing the mixing region defined between the turbine and the stator with the valve in the closed position.

FIG. 17 is a section view taken along line 17-17 in FIG. 6 and shows a plan view of the turbine 118 disposed above and coaxially aligned with the stator 116. FIG. 18 is a section view taken at the cut line 18-18 of FIG. 17 showing the mixing region 119 defined between the turbine 118 and the stator 116 with the valve 130 in the closed position. In certain embodiments, the mixing region 119 is defined between at least a portion of the stator 116 and at least a portion of the turbine 118. In certain embodiments, the mixing region 119 has a length measured between surfaces of the stator 116 and the turbine 118. In some embodiments, the length of the mixing region 119 can be approximately ¼ inch. In some embodiments, the length of the mixing region 119 can be approximately ½ inch. In some embodiments, the length of the mixing region 119 can be less than ¼ inch. In some embodiments, the length of the mixing region 119 can be more than ½ inch. In the illustrated embodiment, the length of the mixing region 119 is approximately ⅓ inch between the manifold 166 and the turbine 118. As is illustrated in FIG. 18, in certain embodiments, the stator 116 comprises the one or more diverters 186. In the illustrated embodiment, the primary flow path 126 passes between adjacent diverters of the one or more diverters 186 in the stator 116. In the illustrated embodiment, the one or more diverters 186 include the angled surfaces 188 that change the heading or flow direction of water that passes through the manifold 166 along the primary flow path 126. In the illustrated embodiment, the angled surfaces 188 of adjacent diverters in combination with the inner wall 172 and the outer wall 170 define a plurality of the primary flow paths 126 through the stator 116. In certain embodiments, the stator 116 does not include the one or more diverters 186.

Figure 19:
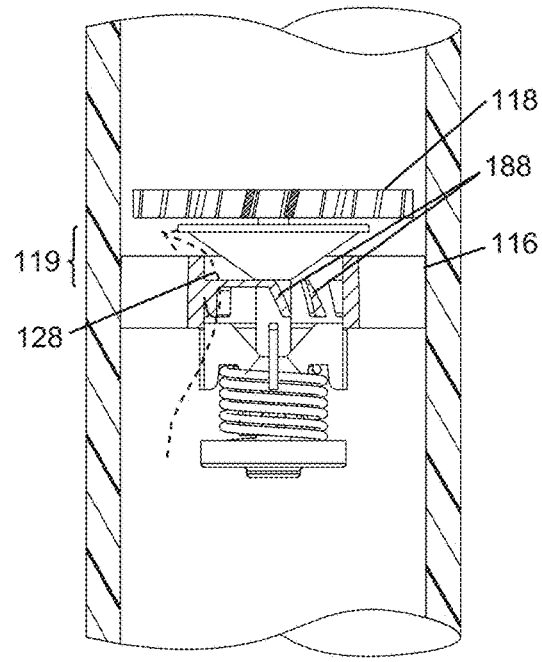
FIG. 19 is similar to FIG. 18 except the valve is in the open position opening the bypass flow path through the stator.

FIG. 19 is similar to FIG. 18 except the valve 130 is in an open position opening the bypass flow path 128 through the stator 116. In certain embodiments, a portion of the stator 116, a portion of the valve 130, and/or a portion of the turbine 118 extends into the mixing region 119. For example, in certain embodiments, a portion of the stator 116, a portion of the valve 130, and/or a portion of the turbine 118 extends into the mixing region 119 depending on, for example, one or more of variations in flow rate, variations in water pressure, changes in size of the nozzle 108, and changes in rotation rate of the turret 106. In the embodiment illustrated in FIG. 19, a portion of the valve 130 extends into the mixing region 119 at least when the bypass flow path 128 is open.

In certain embodiments, the length of the mixing region 119 is selected so that the turbine 118 is close enough to the stator 116 that water deflected by the stator 116 reaches the turbine 118 before straightening towards a flow path that is closer to being parallel with the axis 109. In certain embodiments, the length of the mixing region 119 varies for different size sprinklers 100. For example, in certain embodiments, the length of the mixing region 119 can be reduced for sprinklers 100 that have a smaller diameter.

In certain embodiments, the outer circumference of the stator 116 matches the outer circumference of the turbine 118. In certain other embodiments, the outer circumference of the stator 116 is less than the outer circumference of the turbine 118. In the illustrated embodiment, the outer circumference of the stator 116 is slightly greater than the outer circumference of the turbine 118. In certain embodiments, the plurality of blades 148 are positioned downstream of the one or more diverters 186 of the stator 116.

In certain embodiments, one or both of the stator 116 and the turbine 118 have a cross-sectional area that is coextensive with an inner cross-sectional area of the tubular structure 104. In the illustrated embodiment, the cross-sectional area of the stator 116 is coextensive with the inner cross-sectional area of the tubular structure 104. In the illustrated embodiment, the cross-sectional area of the turbine 118 is slightly less than both the inner cross-sectional area of the tubular structure 104 and the cross-sectional area of the stator 116. In certain embodiments, the cross-sectional area of the turbine 118 is slightly less than the inner cross-sectional area of the tubular structure 104 to provide a gap between the rotating outer circumference of the turbine 118 and the inner wall of the tubular structure 104.

Figure 20:
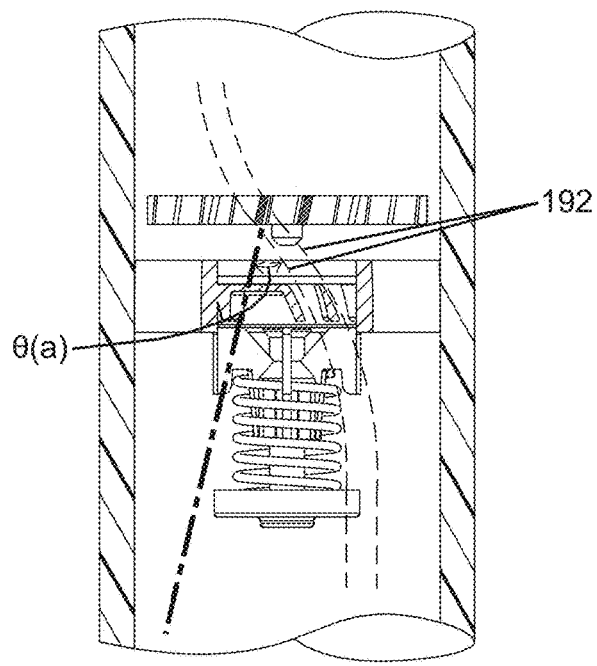
FIG. 20 is similar to FIG. 18 and shows flow field lines representing water flowing through the primary flow path, the one or more diverters of the stator, and the mixing region, before contacting the plurality of blades at an angle of attack of θ(a) when the valve is in the closed position.

FIG. 20 is similar to FIG. 18 and shows flow field lines 192 representing water flowing through the sprinkler 100. For example, in certain embodiments, the flow field lines 192 follow the primary flow path 126, between the one or more diverters 186 of the stator 116, and through the mixing region 119, before contacting the plurality of blades 148 at angle of attack of θ(a). In FIG. 20, all of the water flows through the primary flow path 126 because the valve 130 is in the closed position. In certain embodiments, some of the water flowing through the primary flow path 126 can pass through the bypass section 146 of the turbine 118.

The turret 106 can accommodate different size nozzles 108 that require different amounts of water. It is desirable that the rotation rate of the turbine 118 be relatively stable when different sized nozzles 108 are installed in the turret 106. In certain embodiments disclosed herein, the rotation rate of the sprinkler 100 even with different size nozzles 108 is relatively stable. For example, in certain embodiments, the time variation to complete full rotations with different nozzles 108 installed in the sprinkler 100 is less than 1 minute. In certain embodiments, the time variation to complete full rotations with different nozzles 108 installed in the sprinkler 100 is less than 30 seconds. In certain embodiments, the time variation to complete full rotations with different nozzles 108 installed in the sprinkler 100 is less than 20 seconds.

In certain embodiments, the plurality of blades 148 maintain a relatively stable speed of the turbine 118 regardless of the amount of water required by the sprinkler 100. In certain embodiments, the relatively stable speed of the turbine 118 advantageously provides an increasing torque to the input shaft 120 of the gear drive 122.

Figure 21:
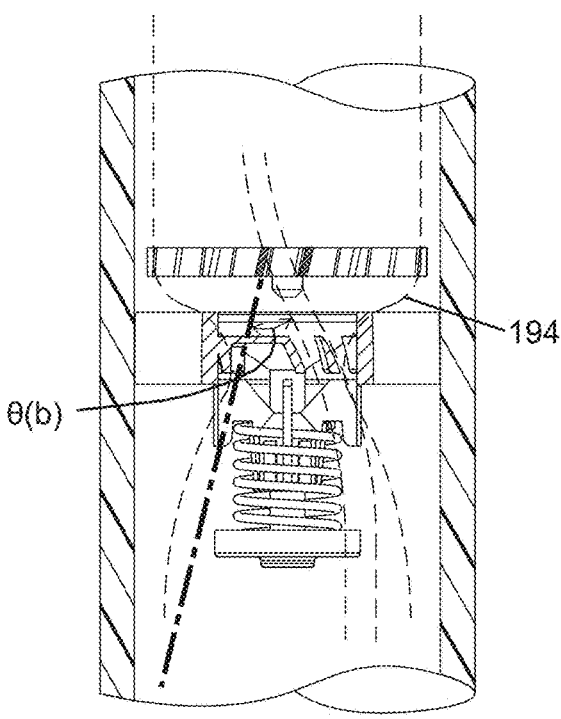
FIG. 21 is similar to FIG. 20 except the valve has been slightly opened and shows flow field lines representing water flowing through the bypass flow path and intersecting in the mixing region with the flow field lines from the primary flow path to change the angle of attack to θ(b).

FIG. 21 is similar to FIG. 20 except the valve 130 has been slightly opened due to the installation of a larger nozzle 108 than was installed in the sprinkler of FIG. 20. FIG. 21 shows flow field lines 194 representing water flowing through the bypass flow path 128 and intersecting in the mixing region 119 with the flow field lines 192 from the primary flow path 126 to change the angle of attack to θ(b). In the illustrated embodiment, the water exits the bypass flow path 128 in a downstream, outward, radial direction. In certain embodiments, the water exits the bypass flow path 128 substantially parallel to one or both surfaces of the valve seat 168 of the stator 116 or the lip 174 of the valve 130. In the illustrated embodiment, the water following the bypass flow path 128 collides or intersects with the water exiting the primary flow path 126. In certain embodiments, a small amount of water passes through the bypass flow path 128 and is aligned to impact the power section 144 of the turbine 118 at close to parallel with the axis 109. The water from both the primary flow path 126 and the bypass flow path 128 form the combined or hybrid flow in the mixing region 119. In certain embodiments, some of the water flowing through the primary flow path 126 and/or the bypass flow path 128 can pass through the bypass section 146 of the turbine 118.

In certain embodiments, the angle of attack for the resulting combined or hybrid flow is θ(b). In the illustrated embodiment, θ(b) is less than θ(a). In certain embodiments, even though the flow rate of the water passing through the power section 144 of the turbine 118 is increased as compared to FIG. 20 due to added water from the bypass flow path 128, the rotation rate of the turbine 118 may stay relatively stable. For example, in certain embodiments, rotation of the turbine 118 stays relatively stable because the expected increase in the rotation of the turbine 118 due to the increased flow rate through the power section 144 is offset by the decrease in angle of attack. In this way, as the flow rate is increased through the power section 144, the angle of attack decreases.

Figure 22:
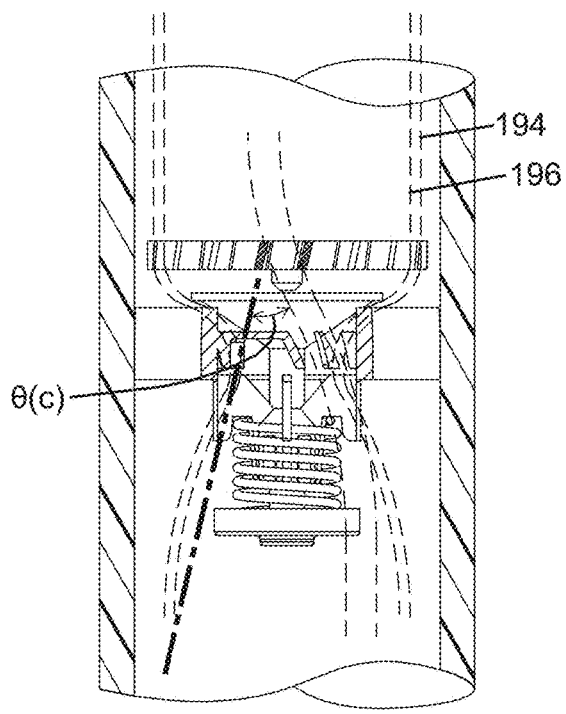
FIG. 22 is similar to FIG. 21 except the valve has been partially opened and shows additional flow field lines representing the water flowing through the bypass flow path and intersecting in the mixing region with the flow field lines from the primary flow path to change the angle of attack to θ(c).

FIG. 22 is similar to FIG. 21 except the valve 130 has been further opened due to the installation of a larger nozzle 108 than was installed in the sprinkler of FIG. 21. FIG. 22 shows additional flow field lines 196 representing more water flowing through the bypass flow path 128 and intersecting in the mixing region 119 with the flow field lines 192 from the primary flow path 126 to further change the angle of attack to θ(c). In the illustrated embodiment, the water exits the bypass flow path 128 in a downstream, outward, radial direction. In certain embodiments, the water exits the bypass flow path 128 substantially parallel to one or both surfaces of the valve seat 168 of the stator 116 or the lip 174 of the valve 130. In the illustrated embodiment, the water following the bypass flow path 128 collides or intersects with the water exiting the primary flow path 126. In certain embodiments, a larger amount of water than in FIG. 21 passes through the bypass flow path 128 and is aligned to impact the power section 144 of the turbine 118 at close to parallel with the axis 109. The water from both the primary flow path 126 and the bypass flow path 128 form the combined or hybrid flow in the mixing region 119. In certain embodiments, some of the water flowing through the primary flow path 126 and/or the bypass flow path 128 can pass through the bypass section 146 of the turbine 118.

In certain embodiments, the angle of attack for the resulting combined or hybrid flow is θ(c). In the illustrated embodiment, θ(c) is less than θ(b). In certain embodiments, even though the flow rate of the water passing through the power section 144 of the turbine 118 is increased as compared to FIG. 21 due to added water from the bypass flow path 128, the rotation rate of the turbine 118 may stay relatively stable. For example, in certain embodiments, rotation of the turbine 118 stays relatively stable because the expected increase in the rotation of the turbine 118 due to the increased flow rate through the power section 144 is offset by the decrease in angle of attack. In this way, as the flow rate is increased through the power section 144, the angle of attack decreases.

Figure 23:
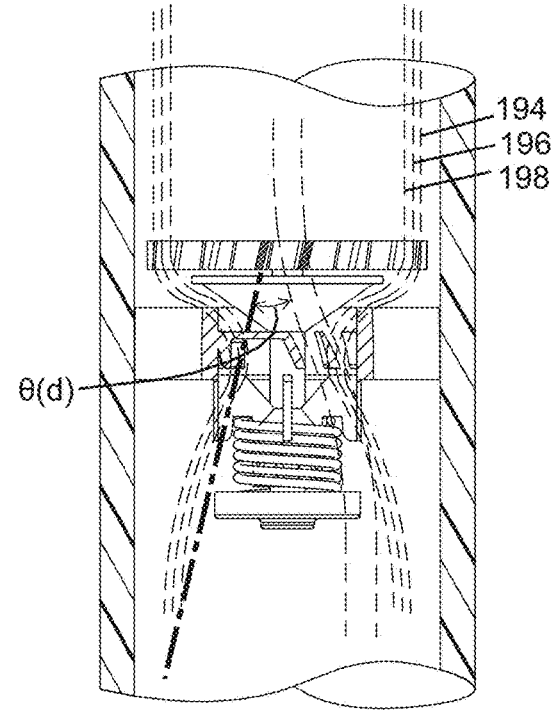
FIG. 23 is similar to FIG. 22 except the valve has been fully opened and shows more additional flow field lines representing the water flowing through the bypass flow path and intersecting in the mixing region with the flow field lines from the primary flow path to change the angle of attack to θ(d).

FIG. 23 is similar to FIG. 22 except the valve 130 has been further opened due to the installation of a larger nozzle 108 than was installed in the sprinkler of FIG. 22. FIG. 23 shows additional flow field lines 198 representing more water flowing through the bypass flow path 128 and intersecting in the mixing region 119 with the flow field lines 192 from the primary flow path 126 to further change the angle of attack to θ(d). In the illustrated embodiment, the water exits the bypass flow path 128 in a downstream, outward, radial direction. In certain embodiments, the water exits the bypass flow path 128 substantially parallel to one or both surfaces of valve seat 168 of the stator 116 or the lip 174 of the valve 130. In the illustrated embodiment, the water following the bypass flow path 128 collides or intersects with the water exiting the primary flow path 126. In certain embodiments, a larger amount of water than in FIG. 22 passes through the bypass flow path 128 and is aligned to impact the power section 144 of the turbine 118 at close to parallel with the axis 109. The water from both the primary flow path 126 and the bypass flow path 128 form the combined or hybrid flow in the mixing region 119. In certain embodiments, some of the water flowing through the primary flow path 126 and/or the bypass flow path 128 can pass through the bypass section 146 of the turbine 118.

In certain embodiments, the angle of attack for the resulting combined or hybrid flow is θ(d). In the illustrated embodiment, θ(d) is less than θ(c). In certain embodiments, even though the flow rate of the water passing through the power section 144 of the turbine 118 is increased as compared to FIG. 22 due to added water from the bypass flow path 128, the rotation rate of the turbine 118 may stay relatively stable. For example, in certain embodiments, rotation of the turbine 118 stays relatively stable because the expected increase in the rotation of the turbine 118 due to the increased flow rate through the power section 144 is offset by the decrease in angle of attack. In this way, as the flow rate increases through the power section 144, the angle of attack decreases.

Figure 24:
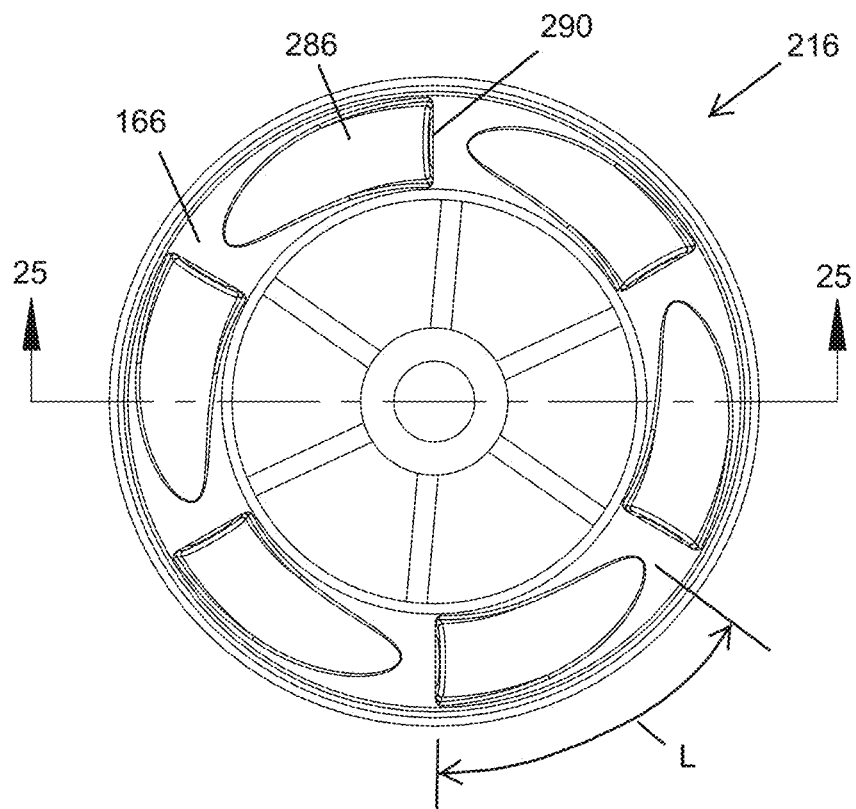
FIG. 24 is a top view of an embodiment of a stator that includes one or more diverters with the valve removed for clarity.
Figure 25:
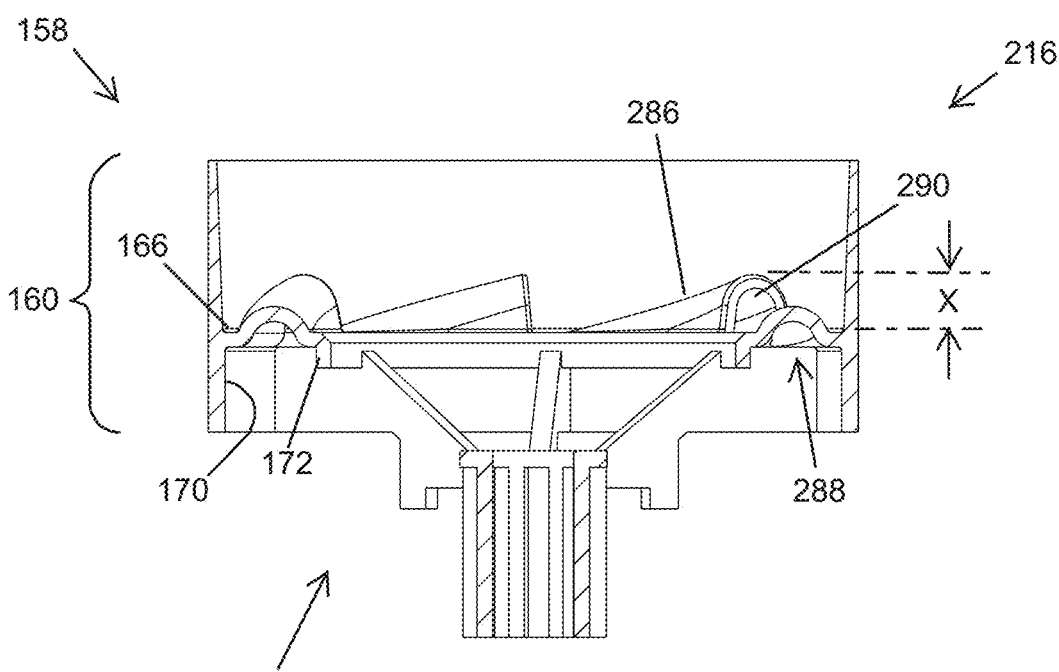
FIG. 25 illustrates a front section view of the stator as seen by the cut line 25-25 of FIG. 24.

FIG. 24 is a top view of an embodiment of a stator 216 that includes one or more diverters 286 with the valve 130 removed for clarity. FIG. 25 illustrates a front section view of the stator 216 as seen by the cut line 25-25 of FIG. 24. In the illustrated embodiment, the stator 216 is located downstream of the inlet 110 and upstream from the turbine 118.

Figure 26:
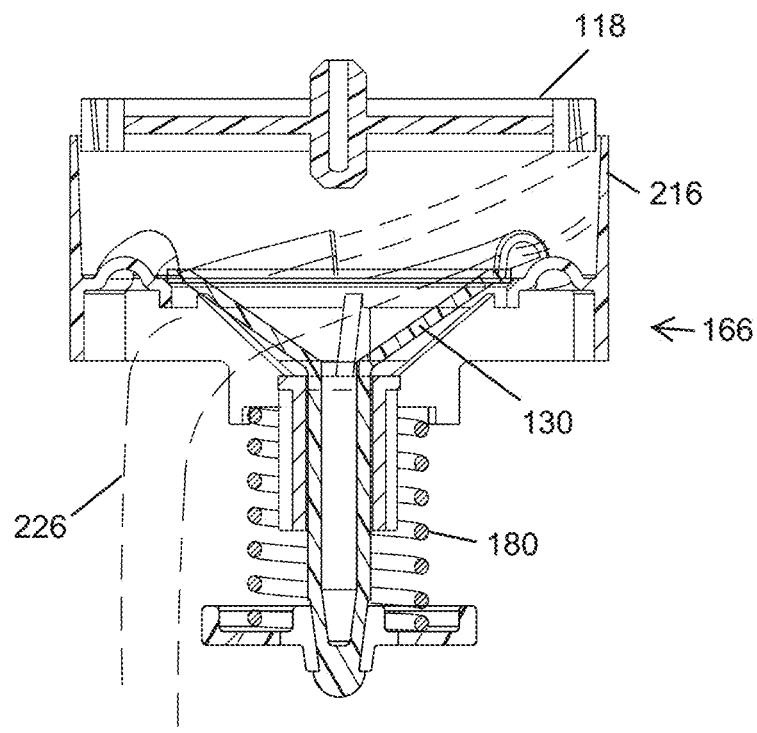
FIG. 26 is similar to FIG. 25 except, for example, the valve, turbine, and spring are included in FIG. 26. The valve is in a closed position.

The one or more diverters 286 are disposed so as to change a direction of a primary flow path 226 through the stator 216. For example, in certain embodiments, the one or more diverters 286 are disposed in the primary flow path 226 and/or the bypass flow path 228. In the illustrated embodiment, the one or more diverters 286 are disposed above at least a portion of the manifold 166 of the primary flow path 226 (FIG. 26). In certain embodiments, the one or more diverters 286 are arranged relative to the primary flow path 226 to change a heading or flow direction of water exiting the primary flow path 226 and entering the mixing region 119.

The one or more diverters 286 illustrated in FIG. 24 protrude from the housing 158 of the stator 216 into the manifold 166. In the illustrated embodiment, a depth X that the one or more diverters 286 protrude into the manifold 166 varies along an arc length L of the one or more diverters 286. For example, in certain embodiments, the depth varies from zero to a maximum of X. In certain embodiments, the variability in the depth X of protrusion forms the tapering shape. In certain embodiments, at least a portion of the tapering shape is smooth. In certain embodiments, at least a portion of the tapering shape includes one or more steps. In the illustrated embodiment, the tapering shape is smooth.

In the illustrated embodiment, at least a portion of each of the one or more diverters 286 forms a passage through the manifold 166. In the illustrated embodiment, the one or more diverters 286 form six passages. Of course, the one or more diverters 286 can form more or less than six passages through the manifold 166.

In certain embodiments, the one or more diverters 286 have the same shape. For example, each of the one or more diverters 286 illustrated in FIG. 24 has a tapering, curved, cross-sectional shape along its arc length L. In certain embodiments, the one or more diverters 286 form grooves 288 in the housing 158 of the stator 216. In certain embodiments, each groove 288 terminates at a first opening 290 into the mixing region 119.

In certain embodiments, the one or more diverters 286 change the heading or flow direction of water that exits the manifold 166 along the primary flow path 226 and parallel to the flow direction 152(a) to the flow direction 152(b) (FIG. 7) when the same water exits the one or more diverters 286. For example, in certain embodiments, the water flowing along the primary flow path 226 and towards the upper portion 160 is diverted to follow the smooth tapering shape of the groove 288 before exiting the groove 288 via the first opening 290. Of course, the one or more diverters 286 can have different shapes as well as different shapes within the same stator 216.

In the illustrated embodiment, the upper portion 160 of the stator 116 comprises the manifold 166. In the illustrated embodiments, the manifold 166 has an annular shape. In the illustrated embodiment, the manifold 166 is disposed about the outer periphery of the stator 116 and below the one or more diverters 286. In the illustrated embodiment, the manifold 166 is formed between the outer wall 170 and the inner wall 172 of the stator 216.

Figure 27:
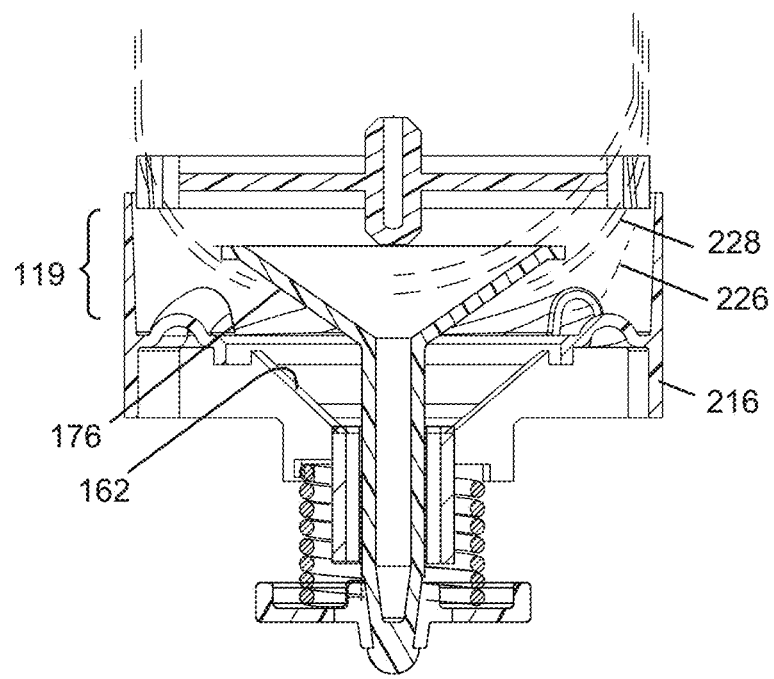
FIG. 27 is similar to FIG. 26 except the valve is in an open position.

FIG. 26 is similar to FIG. 25 except the valve 130, turbine 118, and spring 180 are included in FIG. 26. The valve 130 is in a closed position. FIG. 27 is similar to FIG. 26 except the valve 130 is in an open position. In certain embodiments, the stator 216 defines the primary flow path 226 and a bypass flow path 228 through the stator 216. In certain embodiments, the primary flow path 226 provides a passage for water entering the inlet 110 to pass through the stator 216 and/or the valve 130 before entering the mixing region 119. In the illustrated embodiment, the primary flow path 226 provides a passage for water entering the inlet 110 to pass through the stator 216 before entering the mixing region 119. In the illustrated embodiment, the primary flow path 226 is open when the valve 130 is in either the closed position (FIG. 26) or the open position (FIG. 27). In certain embodiments, the manifold 166 forms at least a portion of the primary flow path 226.

In certain embodiments, the bypass flow path 228 provides a passage for water entering the inlet 110 to pass through the stator 216 and/or the valve 130 before entering the mixing region 119. In the illustrated embodiment, the bypass flow path 228 provides a passage for water entering the inlet 110 to pass between the stator 216 and the valve 130 before entering the mixing region 119. In the illustrated embodiment, the bypass flow path 228 is open when the valve 130 is in the open position (FIG. 27).

In certain embodiments, the primary flow path 226 and the bypass flow path 228 are entirely separate flow paths within the stator 216 and/or the valve 130. In certain other embodiments, the primary flow path 226 and the bypass flow path 228 have one or more connections or flow paths therebetween and within the stator 216 and/or the valve 130. For example, the primary flow path 326 and the bypass flow path 328 illustrated in FIGS. 31-35 are connected by a second opening 392 at least when the valve 130 in in the open position.

In certain embodiments, the bypass flow path 228 is formed between the valve seat 168 of the stator 116 and the lip 174 of the valve 130. In certain embodiments, exits from the primary flow path 226 and the bypass flow path 228 are arranged relative to each other so that water exiting the primary flow path 226 and water exiting the bypass flow path 228 intersect or collide in the mixing region 119. In certain embodiments, one of the primary flow path 226 or the bypass flow path 228 enters the mixing region 119 parallel to the axis 109 with the other one of the primary flow path 226 or the bypass flow path 228 entering the mixing region 119 non-parallel to the axis 109. In certain embodiments, both of the primary flow path 226 and the bypass flow path 228 enter the mixing region 119 non-parallel to the axis 109. In certain embodiments, the combined or hybrid flow resulting from the collision or intersection of the primary flow path 226 with the bypass flow path 228 in the mixing region 119 follows the flow direction 152 into the turbine 118 (see FIG. 7).

Figure 28:
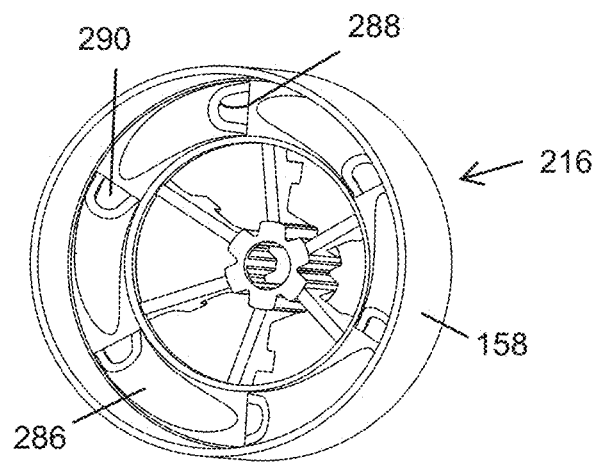
FIG. 28 is a top perspective view of the stator from FIG. 24.

FIG. 28 is a top perspective view of the stator 216 from FIG. 24. As is illustrated in FIG. 28, the one or more diverters 286 form grooves 288 in the housing 158 of the stator 216. In certain embodiments, each groove 288 terminates at the first opening 290. In certain embodiments, the water exiting the opening 290 of the groove 288 enters the mixing region 119.

Figure 29:
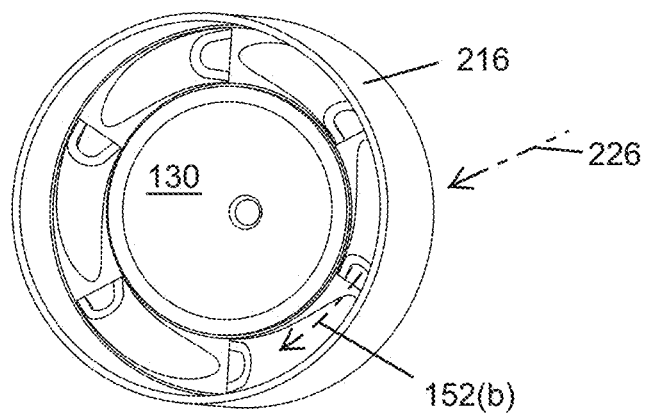
FIG. 29 is similar to FIG. 28 except the valve is included in FIG. 29. The valve is in a closed position.

FIG. 29 is similar to FIG. 28 except the valve 130 is included in FIG. 29. The valve 130 is in a closed position causing water flow along the primary flow path 226 out of the one or more diverters 286 and into the mixing region 119 before contacting the one or more plurality of blades 148 of the turbine 118 at a first angle of attack. In certain embodiments, the grooves 288 direct the water exiting the primary flow path 226 to follow the flow direction 152(b) into the mixing region 119. Depending on whether the water following the primary flow path 226 collides or intersects with water exiting the bypass flow path 228, the flow direction 152 into the turbine 118 can vary. For example, in FIG. 29, the bypass flow path 228 is closed so that the water exiting from the one or more diverters 286 impinges on the turbine 118 at a first angle of attack. In certain embodiments where the bypass flow path 228 is closed, the angle of attack is defined in part by a combination of the heading of the water exiting the primary flow path 226 with the blade angle 150.

Figure 30:
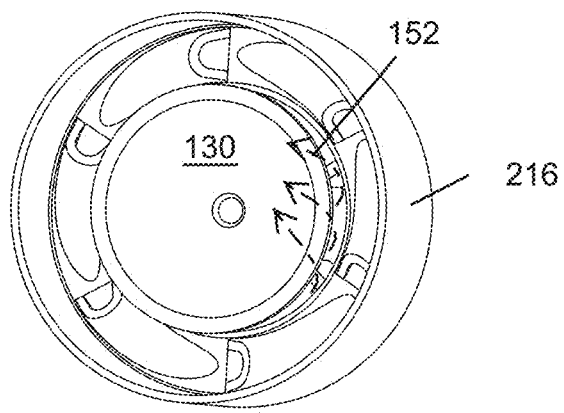
FIG. 30 is similar to FIG. 29 except the valve is in an open position.

FIG. 30 is similar to FIG. 29 except the valve 130 is in an open position opening the bypass flow path 228 through the stator 216 for water to intersect in the mixing region 119 with the water exiting the primary flow path 226 and change the first angle of attack to a second angle of attack. In the illustrated embodiment, the water exits the bypass flow path 228 in a downstream, outward, radial direction. In certain embodiments, the water exits the bypass flow path 228 substantially parallel to one or both surfaces of the valve seat 168 of the stator 216 or the lip 174 of the valve 130. In certain embodiments, the bypass flow path 228 is not open unless the primary flow path 226 is open. In certain other embodiments, the bypass flow path 228 is at least partially open even when the primary flow path 226 is closed. In the illustrated embodiment of FIG. 30, the bypass flow path 228 and the primary flow path 226 are both open. In the illustrated embodiment, the water following the bypass flow path 228 collides or intersects with the water exiting the primary flow path 226. In certain embodiments, the resulting combined or hybrid flow in the mixing region 119 has a heading or flow path across the mixing region 119 that is a combination of the heading of the water exiting the primary flow path 226 with the heading of the water exiting the bypass flow path 228. In this way, the combined or hybrid flow impinges on the turbine 118 at the second angle of attack. In certain embodiments where the bypass flow path 228 is open, the second angle of attack is defined in part by a combination of the heading of the water exiting the primary flow path 226, the heading of the water exiting the bypass flow path 228, and the blade angle 150.

Figure 31:
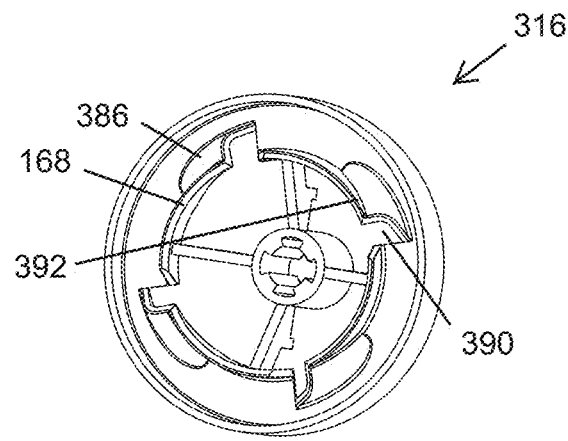
FIG. 31 is a top perspective view of an embodiment of a stator that includes one or more diverters.

FIG. 31 is a top perspective view of an embodiment of a stator 316 that includes one or more diverters 386. Unlike the one or more diverters 286 illustrated in FIG. 24, each of the one or more diverters 386 illustrated in FIG. 31 is open to the bypass flow path 328. For example, in certain embodiments, the one or more diverters 386 are open to the bypass flow path 328 at least when the valve 130 is open. In other embodiments, the one or more diverters 386 are open to the bypass flow path 328 at least when the valve 130 is closed. In certain embodiments, when the valve 130 is closed, the one or more diverters 386 are closed to the bypass flow path 328. In certain embodiments, the combined flow of water through the primary flow path 326 and the bypass flow path 328 can be greater than the combined flow of water through the primary flow path 226 and the bypass flow path 228 of FIG. 27 when the valve 130 is open.

Figure 32:
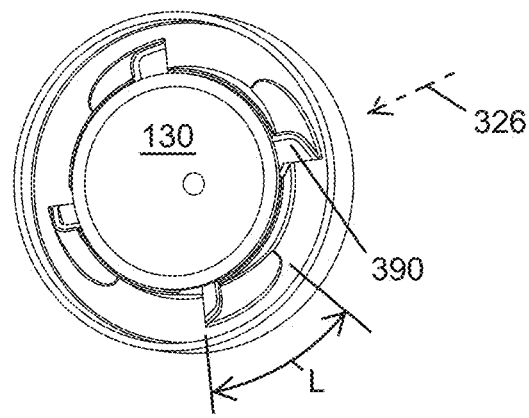
FIG. 32 is similar to FIG. 31 except the valve is included in FIG. 32. The valve is in a closed position.

FIG. 32 is similar to FIG. 31 except the valve 130 is included in FIG. 32. The valve 130 is in a closed position causing water flow along the primary flow path 326 out of the one or more diverters 386 via the first openings 390 and into the mixing region 119 before contacting the one or more plurality of blades 148 of the turbine 118 at a first angle of attack. In certain embodiments, the grooves 388 direct the water exiting the primary flow path 326 to follow the flow direction 152(b) into the mixing region 119. Depending on whether the water following the primary flow path 326 collides or intersects with water exiting the bypass flow path 328, the flow direction 152 into the turbine 118 can vary. For example, in FIG. 34, the bypass flow path 328 is closed so that the water exiting from between the one or more diverters 386 impinges on the turbine 118 at a first angle of attack.

Figure 33:
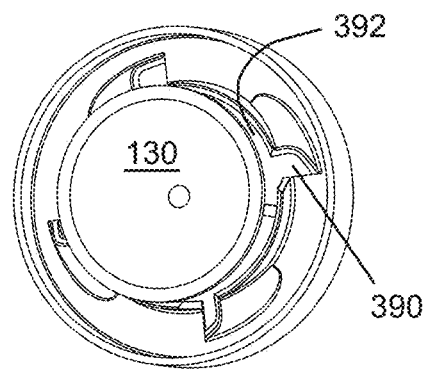
FIG. 33 is similar to FIG. 32 except the valve is in an open position.

FIG. 33 is similar to FIG. 32 except the valve 130 is in an open position opening the bypass flow path 328 through the stator 316 as well as opening a second opening 392 between the one or more diverters 386 and the bypass flow path 328. With the valve 130 open, water flowing through the bypass flow path 328 intersects in the mixing region 119 with the water exiting the primary flow path 326 and changes the first angle of attack to a second angle of attack. When the valve 130 is open, the second opening 392 for water to exit the one or more diverters 386 also opens. In this way, the water following the primary flow path 326 is able to exit the one or more diverters 386 via the first openings 390 as well as via the second openings 392.

In certain embodiments, the second opening 392 is formed by a portion of the first opening 390 when the valve 130 is in the open position. In certain embodiments, the second opening 392 is separate from the first opening 390 when the valve 130 is in the open position. In certain embodiments, at least a portion of the second opening 392 overlaps at least a portion of the first opening 390 when the valve 130 is in the open position. In certain embodiments, the second opening 392 combines with the first opening 390 when the valve 130 is in the open position. In certain embodiments, the combined opening is at least larger that the first opening 390. In the illustrated embodiment, the second opening 392 is generally perpendicular to the first opening 390. Of course, the second opening 392 need not be perpendicular to the first opening 390. For example, in certain embodiments, the second opening 392 is parallel to the first opening 390 or skew to the first opening 390.

In certain embodiments, the water following the primary flow path 326 is able to exit the one or more diverters 386 via the first openings 390 when the valve 130 is closed and exit the one or more diverters 386 via both the first openings 390 and the second openings 392 when the valve 130 is open.

Figure 34:
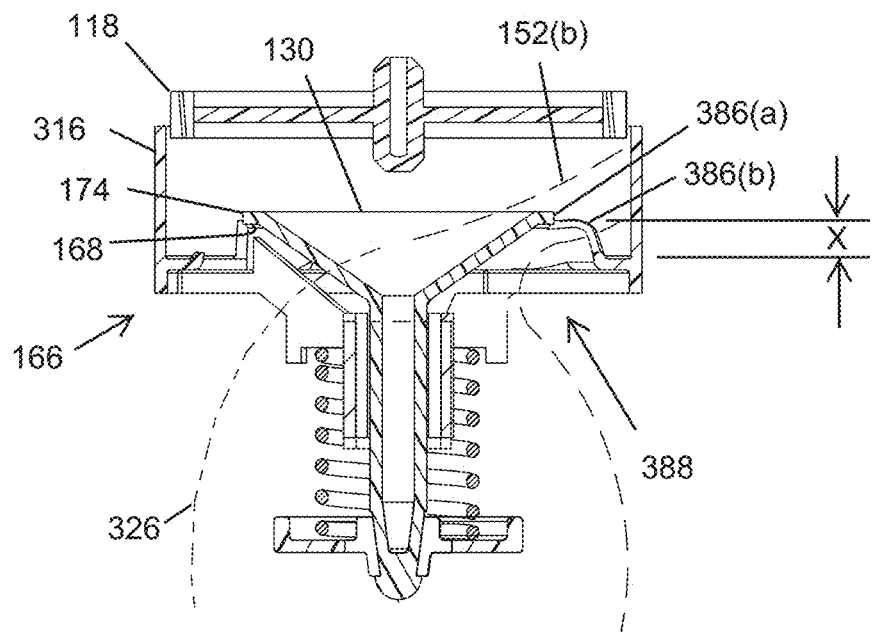
FIG. 34 illustrates a front section view of the stator and valve from FIG. 32 and includes the turbine. The valve is in a closed position.
Figure 35:
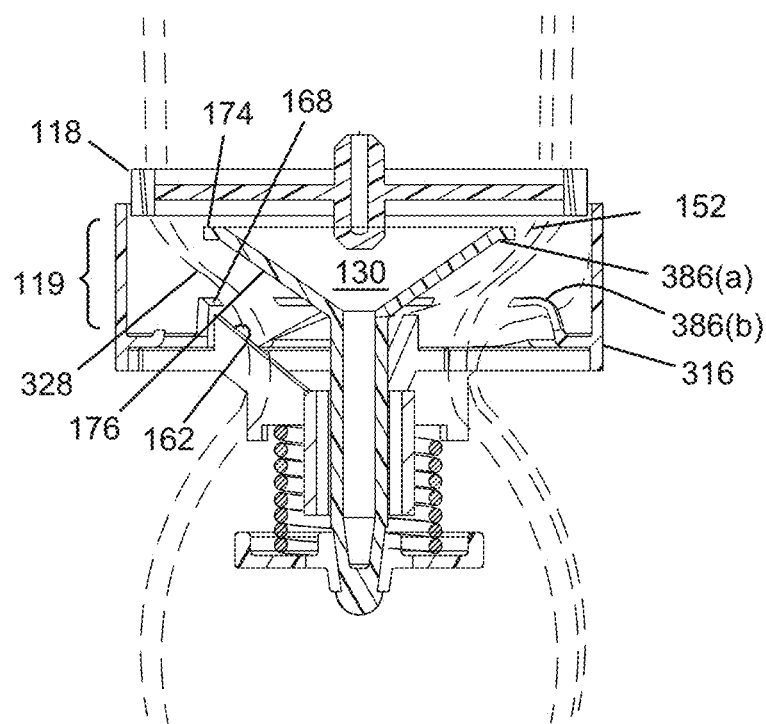
FIG. 35 is similar to FIG. 34 except the valve has moved to an open position that is closer to the turbine.

FIG. 34 illustrates a front section view of the stator 316 and valve 130 from FIG. 32 and includes the turbine 118. The valve 130 is in a closed position. FIG. 35 is similar to FIG. 34 except the valve 130 has moved to an open position that is closer to the turbine 118. In the illustrated embodiment, the water exits the bypass flow path 328 in a downstream, outward, radial direction. In certain embodiments, the water exits the bypass flow path 328 substantially parallel to one or both surfaces of the valve seat 168 of the stator 316 or the lip 174 of the valve 130. In certain embodiments, the bypass flow path 328 is not open unless the primary flow path 326 is open. In certain other embodiments, the bypass flow path 328 is at least partially open even when the primary flow path 326 is closed. In the illustrated embodiment of FIG. 35, the bypass flow path 328 and the primary flow path 326 are both open.

The one or more diverters 386 are disposed so as to change a direction of a primary flow path 326 through the stator 316. For example, in certain embodiments, the one or more diverters 386 are disposed in the primary flow path 326 and/or the bypass flow path 328. In the illustrated embodiment, the one or more diverters 386 are disposed above at least a portion of the manifold 166 of the primary flow path 326 (FIG. 34). In certain embodiments, the one or more diverters 386 are arranged relative to the primary flow path 326 to change a heading or flow direction of water exiting the primary flow path 326 and entering the mixing region 119.

The one or more diverters 386 illustrated in FIGS. 34 and 35 are formed at least in part by a portion 386(a) of the valve 130 and a portion 386(b) of the stator 316. For example, in the illustrated embodiment, each of the one or more diverters 386 is formed by a portion 386(a) of the valve 130 (e.g., the conical portion 176 and the lip 174) in combination with a portion 386(b) of the stator 316 (e.g., the conical section 162 and the valve seat 168). Of course, there can be more than two portions taken from the valve 130 and/or the stator 316 to form at least a portion of each of the one or more diverters 386.

In certain embodiments, at least one of the portions 386(a), 386(b) of the one or more diverters 386 is movable relative to the other portion 386(a), 386(b) of the one or more divertors 386. For example, in the illustrated embodiment, the portion 386(a) of the valve 130 is movable relative to the portion 386(b) of the stator 316. In other embodiments, the portion 386(b) of the stator 316 is movable relative to the portion 386(a) of the valve 130.

In the illustrated embodiment, a depth X that the one or more diverters 386 protrude into the manifold 166 varies along an arc length L of the one or more diverters 386. For example, in certain embodiments, the depth varies from zero to a maximum of X. In certain embodiments, the variability in the depth X of protrusion forms the tapering shape. In certain embodiments, at least a portion of the tapering shape is smooth. In certain embodiments, at least a portion of the tapering shape includes one or more steps. In the illustrated embodiment, the tapering shape is smooth.

In the illustrated embodiment, at least a portion of each of the one or more diverters 386 forms a passage through the manifold 166. As explained above, each passage can have more than one opening (e.g., the first opening 390 and the second opening 392) depending on the position of the valve 130. In the illustrated embodiment, the one or more diverters 386 form four passages. Of course, the one or more diverters 386 can form more or less than four passages through the manifold 166. In the illustrated embodiment, each diverter 386 forms the first opening 390 and the second opening 392 for a total of eight opening at least when the valve 130 is open. Of course, the one or more diverters 386 combined can form more or less that eight openings.

In certain embodiments, the one or more diverters 386 have the same shape. For example, each of the one or more diverters 386 illustrated in FIG. 34 has a tapering cross-sectional shape along its arc length L. As is illustrated in FIG. 34, the one or more diverters 386 have a cross-sectional shape that is partially curved and partially planar. The partially planar portion corresponds to the portion 386(a) of the conical portion 176 and the lip 174 of the valve 130. The partially curved portion corresponds to the portion 386(b) of the conical section 162 of the stator 316. Of course, the illustrated shape of the one or more diverters 386 is only exemplary as the one or more diverters 386 can have any shape.

In certain embodiments, the one or more diverters 386 form grooves 388 in the housing 158 of the stator 316. In certain embodiments, each groove 388 terminates at the first opening 390 into the mixing region 119 when the valve 130 is in the closed position. In certain embodiments, the second opening 392 is formed in a side wall of the groove 388 when the valve 130 is in the open position. In this way, each groove 388 can open directly in the bypass flow path 328 when the valve 130 is in the open position in addition to maintaining an exit via the first opening 390.

In certain embodiments, the one or more diverters 386 change the heading or flow direction of water that exits the manifold 166 along the primary flow path 326 and parallel to the flow direction 152(*a*) to the flow direction 152(*b*) (FIG. 7) when the same water exits the one or more diverters 386. For example, in certain embodiments, the water flowing along the primary flow path 326 and towards the upper portion 160 is diverted to follow the smooth tapering shape of the groove 388 before exiting the groove 388 via the first opening 390. Of course, the one or more diverters 386 can have different shapes, different shapes between the portions 386(*a*), 386(*b*), and/or different shapes within the same stator 316. In certain embodiments, the grooves 388 direct the water exiting the primary flow path 326 to follow the flow direction 152(*b*) into the mixing region 119.

In the illustrated embodiment, the water following the bypass flow path 328 collides or intersects with the water exiting the primary flow path 326 from the first and second openings 390, 292. In certain embodiments, the resulting combined or hybrid flow in the mixing region 119 has a heading or flow path across the mixing region 119 that is a combination of the heading of the water exiting the primary flow path 326 with the heading of the water exiting the bypass flow path 328. In this way, the combined or hybrid flow impinges on the turbine 118 at the second angle of attack. In certain embodiments where the bypass flow path 328 is open, the second angle of attack is defined in part by a combination of the heading of the water exiting the primary flow path 326, the heading of the water exiting the bypass flow path 328, and the blade angle 150.

Depending on whether the water following the primary flow path 326 collides or intersects with water exiting the bypass flow path 328, the flow direction 152 into the turbine 118 can vary. For example, in FIG. 32, the bypass flow path 328 is closed so that the water exiting from between the one or more diverters 386 impinges on the turbine 118 at a first angle of attack. In certain embodiments where the bypass flow path 328 is closed, the angle of attack is defined in part by a combination of the heading of the water exiting the primary flow path 326 with the blade angle 150.

In certain embodiments, much of the additional water that flows through the valve 130 after intersecting or colliding with water from the primary flow path 126, 226, 326 in the mixing region 119 passes through the power section 144. In certain embodiments, even though much of the additional water passes through the power section 144, the sprinkler 100 has a low flow through the bypass section 146 and increasing torque due in part to the increased flow through the power section 144 although it is at a decreasing angle of attack. In certain embodiments, this arrangement keeps the sprinkler 100 rotating at a fairly consistent speed, regardless of how much water is flowing through the sprinkler 100. In certain embodiments, the designs of the one or more diverters 186, 286, 386 in the stator 116, 216, 316, the valve 130, and the plurality of blades 148 determine the speed and profile for the torque. The bypass water provides the additional water required for irrigation. In this way, in certain embodiments, the sprinkler 100 creates additional torque while still keeping the rotation rate of the turbine 118 relatively constant. In certain embodiments, the torque created by the sprinkler 100 to drive the gear drive 122 increases as the water flow through the sprinkler 100 increases. This increasing torque advantageously overcomes drag created by increased side forces within the sprinkler 100 caused by use of larger nozzle 108 while still maintaining a relatively stable speed of rotation.

In operation, the sprinkler 100 is mounted on a riser. As water is introduced into the outer body 102, the tubular structure 104 begins to rise from the bottom end of the outer body 102, raising the tubular structure 104 off the lower annular shoulder 134 to permit water to flow around the outside and into the interior of the screen 114. As the water pressure and flow rate increase, the valve 130 opens, permitting a quantity of the water to intersect or collide with water flowing through the power section 144 of the turbine 118 and impinging on the plurality of blades 148 at an angle of attack. As water pressure and volume increases, the valve 130 opens further and the additional water intersects or collides with the water flowing through the power section 144 to decrease the angle of attack. In this way, as the flow rate increases through the power section 144, the angle of attack decreases causing rotation of the turbine 118 to stay relatively stable and the torque to increase.

Although certain embodiments and examples are disclosed herein, inventive subject matter extends beyond the examples in the specifically disclosed embodiments to other alternative embodiments and/or uses, and to modifications and equivalents thereof. While we have described and illustrated in detail embodiments of a sprinkler with a high-torque, low-bypass turbine and stator arrangement, it should be understood that our inventions can be modified in both arrangement and detail. Thus, the scope of the claims appended hereto is not limited by any of the particular embodiments described above. For example, the sprinkler 100 could be modified to a simplified shrub configuration without the retraction spring 112 and utilizing a shorter outer body 102. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extend beyond the specifically disclosed embodiments to other alternative embodiments and/or uses of the embodiments and certain modifications and equivalents thereof. Accordingly, it is intended that the scope of the sprinkler herein-disclosed should not be limited by the particular disclosed embodiments described above but should be determined only by a fair reading of the claims that follow.

What is claimed is:

1. A rotating sprinkler for irrigation, the sprinkler comprising:
 a housing having an inlet and an outlet;
 a turret mounted on the housing at the outlet and configured to be rotated about an axis relative to the housing;
 a drive mechanism configured to rotate the turret and having an input shaft;
 a turbine coupled to the input shaft and comprising a power section and a bypass section, the power section having a plurality of blades configured to generate torque for rotating the input shaft, the bypass section being configured to allow water to pass through the turbine without significantly driving rotation of the turbine;
 a stator spaced upstream from the turbine to form a mixing region therebetween, the stator comprising one or more diverters having a first opening disposed so as to change a direction of a primary flow path through the stator, the stator forming at least in part a second opening defining a bypass flow path through the stator, the primary flow path being aligned relative to the plurality of blades so that water exiting the first opening traverses the mixing region and impinges on the plurality of blades at a first angle of attack when flow through the second opening is a first amount, the bypass flow path being aligned relative to the primary flow path so that water exiting the second opening intersects the water exiting the first opening in the mixing region to cause the water exiting the first opening to impinge on the plurality of blades at a second angle of attack when the flow through the second opening is a second amount, the second angle of attack and the second amount being different than the first angle of attack and the first amount, respectively; and a valve configured to regulate flow between the primary flow path and the bypass flow path, wherein the first opening is upstream of at least a portion of the second opening when the valve is in an open position.

2. The sprinkler of claim 1, wherein the valve proportions flow between the primary flow path and the bypass flow path.

3. The sprinkler of claim 1, wherein at least a portion of the water exiting the bypass flow path combines with at least a portion of the water exiting the primary flow path in the mixing region.

4. The sprinkler of claim 1, wherein the water exiting the bypass flow path intersects the water exiting the primary flow path at an oblique angle in the mixing region.

5. The sprinkler of claim 1, wherein the valve regulates an amount of the water between the primary flow path and the bypass flow path in response to changes in pressure.

6. The sprinkler of claim 1, wherein the valve regulates an amount of the water between the primary flow path and the bypass flow path in response to changes in flow.

7. The sprinkler of claim 1, wherein the valve defines a surface of the bypass flow path.

8. The sprinkler of claim 1, wherein the valve reciprocates within the stator in response to changes in pressure.

9. The sprinkler of claim 1, wherein the valve reciprocates within the stator in response to changes in flow.

10. The sprinkler of claim 1, wherein at least one of the primary flow path or the bypass flow path is parallel to the axis.

11. The sprinkler of claim 1, wherein at least one of the primary flow path or the bypass flow path is at an angle relative to the axis.

12. A rotating sprinkler for irrigation, the sprinkler comprising:

a housing having an inlet and an outlet;

a turret mounted on the housing at the outlet and configured to be rotated about an axis relative to the housing;

a drive mechanism configured to rotate the turret and having an input shaft;

a turbine coupled to the input shaft and comprising a power section and a bypass section, the power section having a plurality of blades configured to generate torque for rotating the input shaft, the bypass section being configured to allow water to pass through the turbine without significantly driving rotation of the turbine;

a stator spaced upstream from the turbine, the stator comprising one or more diverters having a first opening disposed so as to change a direction of a primary flow path through the stator, the stator forming at least in part a second opening defining a bypass flow path through the stator, the primary flow path being aligned relative to the plurality of blades so that water exiting the first opening impinges on the plurality of blades at a first angle of attack when flow through the second opening is a first amount, the bypass flow path being aligned relative to the primary flow path so that water exiting the second opening intersects the water exiting the first opening to cause the water exiting the first opening to impinge on the plurality of blades at a second angle of attack when the flow through the second opening is a second amount, the second angle of attack and the second amount being different than the first angle of attack and the first amount, respectively; and a valve configured to regulate flow between the primary flow path and the bypass flow path, wherein the first opening is upstream of at least a portion of the second opening when the valve is in an open position.

13. The sprinkler of claim 12, wherein the housing is a tubular structure at least partially disposed in a body, the tubular structure being configured to telescope from the body, the body being configured for attachment to a riser.

14. The sprinkler of claim 12, wherein the drive mechanism is configured to rotate the turret in both a clockwise and a counterclockwise direction about the axis.

15. A rotating sprinkler for irrigation, the sprinkler comprising:

a housing having an inlet and an outlet;

a turret mounted on the housing at the outlet and configured to be rotated about an axis relative to the housing;

a drive mechanism configured to rotate the turret and having an input shaft;

a turbine coupled to the input shaft and comprising a power section and a bypass section, the power section having a plurality of blades configured to generate torque for rotating the input shaft, the bypass section being configured to allow water to pass through the turbine without significantly driving rotation of the turbine;

a stator spaced upstream from the turbine, the stator comprising one or more diverters having a first opening disposed so as to change a direction of a primary flow path through the stator, the stator forming at least in part a second opening defining a bypass flow path that together impinge on the plurality of blades, the primary flow path and the bypass flow path being aligned relative to each other so that as a flow of water increases through the second opening, an angle of attack between the water exiting the first opening and the plurality of blades decreases; and a valve configured to regulate flow between the primary flow path and the bypass flow path, wherein the first opening is upstream of at least a portion of the second opening when the valve is in an open position.

16. The sprinkler of claim 15, wherein the primary flow path and the bypass flow path are aligned relative to each other so that as the flow of water increases through the inlet, a rate of rotation of the turret about the axis is relatively stable.

17. The sprinkler of claim 15, wherein the primary flow path and the bypass flow path are aligned relative to each other so that as the flow of water increases through the inlet, an amount of torque created by the turbine increases.

18. The sprinkler of claim 15, further comprising a mixing region formed between the stator and the turbine, at least a portion of the valve being disposed in the mixing region when the valve is in the open position.

19. The sprinkler of claim 1, wherein the bypass section allows some of the water flowing through the primary flow path and/or the bypass flow path to pass therethrough.

20. The sprinkler of claim 1, wherein the turbine comprises an annular body.

21. The sprinkler of claim 20, wherein the bypass section is disposed within an area of the annular body.

22. The sprinkler of claim 21, wherein the power section is disposed outside an outer circumference of the annular body.

23. The sprinkler of claim 22, wherein the power section is at least a portion of a region defined between the outer circumference of the annular body and an inner surface of the turret.

* * * * *